(12) United States Patent
Weigert et al.

(10) Patent No.: US 8,572,093 B2
(45) Date of Patent: Oct. 29, 2013

(54) SYSTEM AND METHOD FOR PROVIDING A LICENSE DESCRIPTION SYNTAX IN A SOFTWARE DUE DILIGENCE SYSTEM

(75) Inventors: Juergen Weigert, Duerrwangen (DE); Christopher De Nicolo, Regensburg (DE)

(73) Assignee: EMC Corporation, Hopkinton, MA (US)

( * ) Notice: Subject to any disclaimer, the term of this patent is extended or adjusted under 35 U.S.C. 154(b) by 884 days.

(21) Appl. No.: 12/352,917

(22) Filed: Jan. 13, 2009

(65) Prior Publication Data

US 2010/0185686 A1    Jul. 22, 2010

(51) Int. Cl.
*G06F 7/02*    (2006.01)
*G06F 7/22*    (2006.01)

(52) U.S. Cl.
USPC ............................ 707/748; 707/758; 705/59

(58) Field of Classification Search
None
See application file for complete search history.

(56) References Cited

U.S. PATENT DOCUMENTS

| | | | |
|---|---|---|---|
| 5,671,412 A * | 9/1997 | Christiano | 1/1 |
| 6,343,376 B1 | 1/2002 | Saxe et al. | 717/9 |
| 6,978,419 B1 | 12/2005 | Kantrowitz | 715/511 |
| 2005/0125358 A1 | 6/2005 | Levin et al. | 705/59 |
| 2005/0125359 A1 | 6/2005 | Levin et al. | 705/59 |
| 2006/0242077 A1 | 10/2006 | Dettinger et al. | 705/59 |
| 2007/0271190 A1 * | 11/2007 | Foster | 705/59 |
| 2008/0005086 A1 * | 1/2008 | Moore | 707/3 |
| 2008/0091938 A1 | 4/2008 | Pedersen et al. | 713/153 |
| 2009/0086964 A1 * | 4/2009 | Agrawal et al. | 380/44 |

OTHER PUBLICATIONS

Baker, Brenda, S., "Selected Projects and Papers", copyright 2001 Lucent Technologies, printed from the Internet, <http://cm.bell-labs.com/who/bsb/research.html>, 2 pages.
Black Duck™ Code Center, "Accelerating Component-Based Software Development", Brochure No. DS-SC-0809-UL-AE, copyright 2007-2008 Black Duck, two-page brochure.
Black Duck™ Export, "Encryption Export Compliance", Brochure No. DS-SE-0807-UL-AC, copyright 2007-2008 Black Duck, two-page brochure.
Black Duck™ "Software Compliance Management; Automating License Compliance in the New, Mixed-IP Development World", copyright 2008 Black Duck Software, Inc., blackducksoftware.com, 7 pages.
Black Duck™ "String Search and You May Find", copyright 2008 Black Duck Software, Inc., blackducksoftware.com, 6 pages.
Black Duck™ "The Quest for an 'Open Source Genome'", copyright 2007 Black Duck Software, Inc., blackducksoftware.com, 9 pages.

(Continued)

*Primary Examiner* — Anteneh Girma
*Assistant Examiner* — Miranda Huang
(74) *Attorney, Agent, or Firm* — Barry N. Young

(57) ABSTRACT

Described herein is a system and method for providing a condensed license description syntax for use in a software due diligence system. In particular, the license description syntax may employ a limited number of verifiable attributes to provide precision and lack of redundancy in describing various software licenses relevant to software due diligence. For example, the software due diligence system may identify licenses in software under review and invoke a compiler configured to perform various operations on the license description syntax to check for permissions and obligations associated with the identified licenses (e.g., name translation, operator translation, logical expression evaluation, etc.). Thus, the license description syntax may enable the license database to be established as a global public or private license database, in addition to providing licenses attributes useful in software due diligence review.

19 Claims, 8 Drawing Sheets

(56) References Cited

OTHER PUBLICATIONS

"BOSS 2 Online Submission System", copyright 2004-2009 The University of Warwick, printed from the Internet, <http://www.boss.org.uk>, 2 pages.

Bulychev, Peter, et al., "Duplicate Code Detection Using Anti-Unification", 4 pages.

"Do Static Source Code Analysis Tools Really Work?", May 19, 2008, printed from the Internet, <http://developers.slashdot.org/article.pl?sid=08/05/19/1510245>, 24 pages.

"Finding Duplicate Code", SourceForget.net, printed from the Internet, <http://pmd.sourceforge.net/cpd.html>, 3 pages.

JPlag Detecting Software Plagiarism, printed from the Internet, <http://www.ipd.uni-karlsruhe.de/jplag>, 1 page.

Malpohl, Guido, et al., "Renaming Detection", University of Karlsruhe, IPD, 8 pages.

"On Licensing—Bobulate", Apr. 8, 2008, printed from the Internet, <http://people.fruitsalad.org/adridg/bobulate/index.php?/archives/554-On-licensing.html>, 3 pages.

"Open Source License", from Wikipedia, the free encyclopedia, printed from the Internet, <http://en.wikipedia.org/wiki/Open_source_license.>, 5 pages.

Palamida™, "Making Application Security a Top Priority in Your Security Strategy", 8-page brochure.

Palamida™, Palamida Enterprise Edition 3.0, Product Brief, copyright 2008 Palamida, Inc., 4 pages.

"Ranking fur Plagiatserkennung-Software Veroffentlicht", Sep. 27, 2007, printed from the Internet, <http://www.heise.de/newsticker/meldung/96658>, 2 pages.

Schuler, David, et al., "A Dynamic Birthmark for Java", *ASE '07*, Nov. 4-9, 2007, Atlanta, Georgia, 9 pages.

"Simian—Similarity Analyser", copyright 2003-08 RedHill Consulting Pty, Ltd., printed from the Internet, <http://www.redhillconsulting.com.au/products/simian>, 2 pages.

"Ssdeep", Maintainer: Jesse Kornblum, printed from the Internet, <http://www.forensicswiki.org/wiki/Ssdeep>, Apr. 9, 2007, 2 pages.

"ssdeep—Latest Version 2.1", printed from the Internet, <http://ssdeep.sourceforge.net>, Jan. 1, 2009, 3 pages.

"Undocumented Open Source Leaves a Gap in Your Application Security Strategy" White Paper, Palamida™, copyright 2008 Palamida, Inc., 9 pages.

Wu, Sun, et al., "A Fast Algorithm for Multi-Pattern Searching", May 1994, 11 pages.

\* cited by examiner

SYSTEM AND METHOD FOR PROVIDING A LICENSE DESCRIPTION SYNTAX IN A SOFTWARE DUE DILIGENCE SYSTEM

FIELD OF THE INVENTION

The invention generally relates to a system and method for providing a condensed license description syntax in a software due diligence system, and in particular to using a limited number of verifiable attributes to provide precision and a lack of redundancy in describing various software licenses relevant to software due diligence.

BACKGROUND OF THE INVENTION

Issues concerning software due diligence and legal review have become increasingly important in view of recent software development trends, including prevalent usage of open source software and encryption technology in many software products. Although open source software can generally be used and shared for free, open source is not considered public domain because various licenses typically impose restrictions on the use, modification, or redistribution of the open source code (e.g., the GNU General Public License, the Berkeley Software Distribution License, etc.). Furthermore, because different open source licenses tend to impose restrictions that can vary significantly in scope, organizations that produce or otherwise develop software should take care to review and understand the various terms and conditions that may be associated with using open source software. As such, although open source software can provide various advantages (e.g., reducing the cost to develop reusable components), the use of open source should be carefully managed and documented to preserve intellectual property (IP) rights, avoid unpredictable royalty obligations, and otherwise prevent latent security vulnerabilities.

For instance, software development organizations often employ a common code base that can include hundreds or thousands of packages used in the development of various software products, with many of the packages potentially containing open source or being subject to various open source licenses. Furthermore, the packages in the code base can often further contain hundreds, thousands, or even millions of source files that may be subject to different open source licenses. Ensuring license compliance and compatibility for all of the software in a given product can be very difficult, as open source software typically originates from one or more upstream repositories or other sources that are beyond the control of the development organization. For example, the upstream repositories will usually declare various project licenses for a given open source package, whereby individual files within the package are further claimed under the declared licenses. In many cases, code developers and contributors would then be bound to the terms and conditions of the declared licenses. However, in various other cases, certain licenses may permit the addition of source code under other licenses deemed to be compatible with the declared licenses, or the licenses may permit the extraction of certain clauses or other portions under relaxed terms and conditions with regard to the declared licenses. As such, the compatibility of different open source licenses may not always be clearly discernable, as a given package may often several different software components (e.g., libraries, main application, test suites, etc.), yet different open source licenses may vary in whether they permit or prohibit the use of different or incompatible licenses for the various components.

Thus, one important concern associated with software due diligence review includes the need to ensure compliance and compatibility within individual components, along dependency chains, and among various components of a larger software product. In particular, a large number of known open source licenses exist, on the order of several hundreds, potentially creating many different variations and combinations of licenses that may be permitted and/or prohibited for a given software component. While some software development organizations use databases or package management systems to document the use of open source (e.g., Red Hat Package Manager (RPM)), the space available in metadata fields or RPM headers for describing software licenses is generally limited to a few words (i.e., typically one line of text). As such, existing systems fall short in providing a mechanism for representing and tracking known licenses, license versions, license compatibility, and other compliance issues according to a well defined and condensed syntax.

Other difficulties may also be encountered when performing software due diligence review, including the inspection of binary objects and the scalability of solutions used to manage large build systems and code bases. In particular, the build system and code base used within a given software development organization often includes binary files that have been compiled or otherwise constructed from source code. However, binaries tend to be more challenging to inspect for license compliance than the underlying source code because the source code typically includes text that can be inspected one line at a time, whereas binaries tend to be object files that often cannot be read using simple unpack and inspect processes. Regarding scalability issues, moreover, the utility of sequential pattern matching techniques tends to decrease substantially as the number of software components in a code base increases. Although parallel pattern matching techniques may address the issue of scalability to a degree, an important consideration in the use of such techniques is the need to ensure that no false negatives occur, while also ensuring that false positives do not unduly burden the review process. That is, false negatives may be considered unacceptable because they can lead to latent compliance defects, while excessive false positives may introduce unnecessary and costly delays in the review process.

Yet another concern relating to software due diligence arises in relation to software that uses undocumented and/or improperly documented open source. For example, open source that has been used in a given software component often lacks proper documentation for various reasons, such as developers not fully considering or understanding the legal issues that are involved with open source. In addition, open source components often carry prominent copyright or license information and liberally point to portions of borrowed code, but closed source components do not. As such, issues may arise when components appear to be closed source but actually contain open source components that lack proper documentation (e.g., a developer may use open source in a project but overlook the need to include proper license documentation, or insubstantial changes may be made to a few lines of the code in an effort to avoid license restrictions). Thus, another important aspect of software due diligence includes ensuring that open source is properly identified, documented, tracked, and reviewed for licensing compatibility and compliance.

SUMMARY OF THE INVENTION

According to various aspects of the invention, a system and method for automating software due diligence may address these and other drawbacks of existing systems. In particular, the invention may be used to perform software due diligence, which may generally include reviewing software components for compliance and compatibility with open source licenses, intellectual property (IP) rights, export regulations, or other such issues.

According to one aspect of the invention, the system for automating software due diligence may be used to track licenses, risk levels, distribution status, and other compliance issues for software subject to due diligence review. In particular, the system may be used to review software to identify references to known open source licenses, external licenses, end user license agreements, other software licenses, and/or cryptographic algorithms that may present issues for export controls or regulations (e.g., using cross-references to software known to have export defects). If the software under review includes one or more open source licenses or other relevant legal language, the system may check for permissions and obligations associated with attributes of the open source licenses or other legal language to draw inferences regarding potential compliance problems. Further, the system may include a code provenance engine that reviews software for undocumented or improperly documented source code (including open source and/or closed source, as appropriate). For example, the code provenance review engine may retrieve information relating to software from various third-party repositories, which may have known origins and license terms, and the third-party software may be compared to software under review to identify undocumented and/or improperly documented source code.

According to one aspect of the invention, the system for automating software due diligence may include a license database that stores information describing various software licenses. The licenses may be described in the license database according to a condensed license description syntax, which may contain a limited number of verifiable attributes to provide precision and lack of redundancy in describing known software licenses. In particular, a given entry in the license database may uniquely describe one version of a software license, even for licenses that may have multiple names known to be in circulation (e.g., because of the existence of multiple sources and/or authors for the license). For example, in one implementation, the license description syntax may provide a short name and/or an integer identifier to each license described in the license database, wherein the short name and/or integer identifier may be restricted to one use within a namespace for the license database. If the authoritative text for a particular license falls into disuse or undergoes substantial revision, a new short name and/or integer identifier may be assigned to the license. Thus, the license description syntax may enable the license database to be established as a global license database (or library), which may be made available for public, private, or other forms of access.

According to one aspect of the invention, the system for automating software due diligence may further include a compiler configured to perform various operations on the license description syntax. For example, the compiler may be configured to perform operations that include translation between a short name and an integer identifier for a particular license,. translation between word and symbol operators, translation between the license description syntax and readable English suitable for human consumption, optimization of logical expressions for size and readability, and/or evaluation of logical expressions to identify equivalences, inclusions, contradictions, or various other relationships that can be expressed using the license description syntax.

According to one aspect of the invention, the system may include a workflow engine that a compliance officer or other authorized reviewer can use to direct, manage, or otherwise participate in due diligence review for software components under review. The workflow engine may be configured to track one or more workflows and/or sub-workflows that define the due diligence review process (e.g., a SWAMP workflow that may include various different people working on different process steps). As such, the compliance officer or other authorized reviewer may monitor the workflow to manage remediation of the compliance issues (e.g., using a web-based interface created from a workflow definition file for a particular software component). The workflow may guide users through the remediation process, send notifications where required, assemble overview pages over running processes, schedule time-critical workflow paths, or provide other features useful in managing the review process for software under review.

According to one aspect of the invention, the system may be integrated with a package build system, wherein software submitted to the build system may be automatically subject to due diligence review. For example, whenever a new software package is compiled or otherwise submitted to the build system, the software diligence engine may automatically schedule a review of the package submission for compliance issues, construct a report for the review, and estimate a risk level for the reviewed package. Any new packages may be initially associated with a "candidate" status, wherein candidate packages may initially be blocked from distribution pending due diligence review. If the candidate package is determined to be in compliance with open source licenses, export regulations, and other requirements, the status of the package may be changed to "production" status to permit distribution. Additionally, a review may be automatically scheduled whenever an existing package is updated in the build system. For example, the risk level for the updated package following the updated review may be compared to a product-specific threshold to determine a distribution status for the updated package (e.g., packages in production status may return to candidate status if the updated review identifies compliance issues, thereby blocking distribution of the update).

According to one aspect of the invention, to perform automated software due diligence, the system may include a binary scan engine that can extract information from one or more binary objects. For example, whenever a package or other binary file passes through the build system, the build system may create debug information that can be used to troubleshoot later crashes or other problems for the software. As such, the binary scan engine may search the debug information to match one or more source files to binary objects and otherwise identify dependencies of the binary objects. The binary scan engine may further scan binary representations to identify further dependency information relating to software under review (e.g., linkable objects exported by a package or source binary, statically linked objects included from other packages, dynamically linked objects that reference other packages, etc.). The dependency information may be used to generate or otherwise update a component dependency tree that identifies source code that may be associated with the binary.

According to one aspect of the invention, the system may include an unpacking engine configured to expose plain text information for source code packages or other types of archives provided for review. The unpacking engine may recursively unpack source code files as deeply as possible, while also deriving metadata describing the unpacked files (e.g., package name, version, release, etc.). For example, the unpacking engine may support unpacking for source code packages (e.g., RPM packages), compressed or archived files (e.g., TAR, ZIP, JAR, or other archive files), partially unpacked inputs (e.g., directories containing a .spec file, readme file, patches, TAR archives, etc.), or various other inputs associated with a plurality of source files. Further, a particular package, archive, or other collection of source files may include software at various different levels (e.g., in a hierarchical directory or tree), and the unpacking engine may recursively unpack the software until the software has been fully unpacked. The unpacked source files may then be sorted and post-processed to expose plain text information. For example, the unpacking engine may post-process unpacked files of a type having a well known textual representation to expose underlying plain text information, report code-based binaries to the binary scan engine for further analysis (unless the binary scan engine has already analyzed the binary), and/or discard non-code binaries from further review (e.g., images, raw data, etc.).

According to one aspect of the invention, the system may include a fingerprinting module for calculating a unique file fingerprint for binaries and/or unpacked source files under review. The unique file fingerprint for each binary and/or unpacked file may be compared to existing file fingerprints to determine whether the associated software has already been reviewed. If the unique file fingerprint for a particular binary and/or unpacked file exists in the package database, information relating to the prior review may be retrieved and associated with the particular binary and/or unpacked file to avoid duplicative review for the associated software (e.g., prior reviews containing the unique file fingerprint may indicate that the software was reviewed in connection with one or more other packages). In one implementation, if any new patterns relevant to due diligence review have been added to the system since the unique file fingerprint was generated for a given binary and/or unpacked file, the file fingerprint shortcut may be skipped, or the previous review may be automatically updated to account for the new patterns. In this manner, the due diligence review for previously reviewed software may be refreshed to account for changes since the previous reviews.

According to one aspect of the invention, the system may include a keyword matching module that searches the plain text representation of unpacked files to identify any strings and/or sub-strings that match entries in a predefined list of keywords. For example, the list of keywords may contain terms, vocabulary, or other information considered likely to appear in legal language or other contexts relevant to due diligence review. In one implementation, the keyword matching module may identify normal keywords, negative keywords, weak normal keywords, and/or weak negative keywords within a source file under review. Normal keywords may generally indicate relevant legal language or other vocabulary associated with software due diligence issues, while negative keywords may negate normal keyword matches that may appear within a threshold proximity of the negative keyword. Weak normal keywords are similar to normal keywords, except that weak normal keywords alone do not trigger a match. Rather, weak normal keywords may only trigger a match when surrounded with other keywords to the extent of causing a normal counter to exceed a first threshold value. Weak negative keywords may be applied to negative keywords in a similar manner. In particular, occurrences of weak negative keywords may increment a negative counter, wherein values associated with the weak negative keywords may be subtracted from the normal counter if the negative counter exceeds a second threshold value. Thus, weak negative keywords may only negate a match to the extent of causing the negative counter to exceed the second threshold value and further causing the normal counter to remain below the first threshold value.

According to one aspect of the invention, the system may include a pattern matching module that matches keywords identified in a source file against a plurality of text patterns that contain language relevant to due diligence review (e.g., an excerpt of legal language). The text patterns may generally include any suitable string considered relevant to software due diligence, such as text within a software license (e.g., GPL, LGPL, etc.) or another entry in the license database (e.g., a cryptographic algorithm). Moreover, the text patterns may include negative text patterns for covering keywords within a context known to be irrelevant to legal interpretation. In one implementation, the pattern matching module may pre-process files under review to normalize comment styles and whitespace usage that may otherwise result in non-substantive pattern match irregularities (e.g., resulting from different coding styles). The pattern matching module may then search for text patterns that cover keywords contained in the file, and any keywords that remain uncovered may be flagged for manual review. For example, unmatched keywords may identify new relevant (or irrelevant) text patterns, which may be used to create new text patterns based on how certain keywords appear within source code (e.g., a dialogue window may present context surrounding the unmatched keyword, wherein the context may be edited to create a new text pattern to cover the unmatched keyword).

According to one aspect of the invention, the system may include a code provenance engine that reviews software for undocumented and/or improperly documented source code. In particular, because the absence of relevant keywords or text patterns in a source file may not necessarily indicate that the source file is free of software due diligence issues (e.g., because a developer inadvertently or purposely failed to declare a license), the code provenance engine may determine whether software identified as closed source (or proprietary) actually includes undocumented and/or improperly documented open source components. In addition, the code provenance engine may cross-reference software that contains open source against open source known to be well-documented to derive reliability information for the open source software under review (e.g., to raise confidence in the information provided in the software under review by enumerating redundancy). Thus, the code provenance engine may download or otherwise obtain information relating to known open source from various third-party repositories for comparison with source files under review. For example, the code provenance engine may fracture or otherwise sub-divide the known open source and the software under review into one or more blocks and/or sub-blocks. In one implementation, the code provenance engine may be configured to fracture or otherwise sub-divide the open source and/or software under review in a manner agnostic to programming language (e.g., to ensure that the fracturing method can be applied to source code written in many different languages, including languages that may be developed in the future). The code provenance engine may then create a unique fingerprint for the fractured blocks and/or sub-blocks, wherein matching unique fingerprints may indicate whether a particular source file has undocumented and/or improperly documented source code.

According to one aspect of the invention, the system may create a compliance report after software has been subject to due diligence review, including license review and/or export review. The compliance report may be attached to appropriate entries in the package database, and may indicate a level of risk that a particular software package or portion thereof may raise. Compliance officers or other authorized reviewers may then analyze the reports to determine how to handle distribution of the software, define one or more rules to govern remediation of any compliance issues, construct workflows to manage the remediation, or otherwise finalize the due diligence review process. In one implementation, the compliance reports may also include an indication of whether the software component includes multiple licenses or inter-package relationships, in which case the compliance officer or other authorized reviewer may be required to resolve the relationships among the multiple licenses or packages. Furthermore, in one implementation, when the report for a particular software component identifies a license declaration and/or code provenance issue, the license declaration and/or code provenance issue may be associated with a license distance that reflects a level of certainty (or uncertainty) for the declaration. In particular, each license declaration and/or code provenance issue in reviewed software component may be assigned a license distance, providing a quality metric to estimate the reliability of the license declarations (or lack thereof).

Other aspects, implementations, objects, and advantages of the invention will be apparent based on the following drawings and detailed description.

DETAILED DESCRIPTION

Figure 1A:
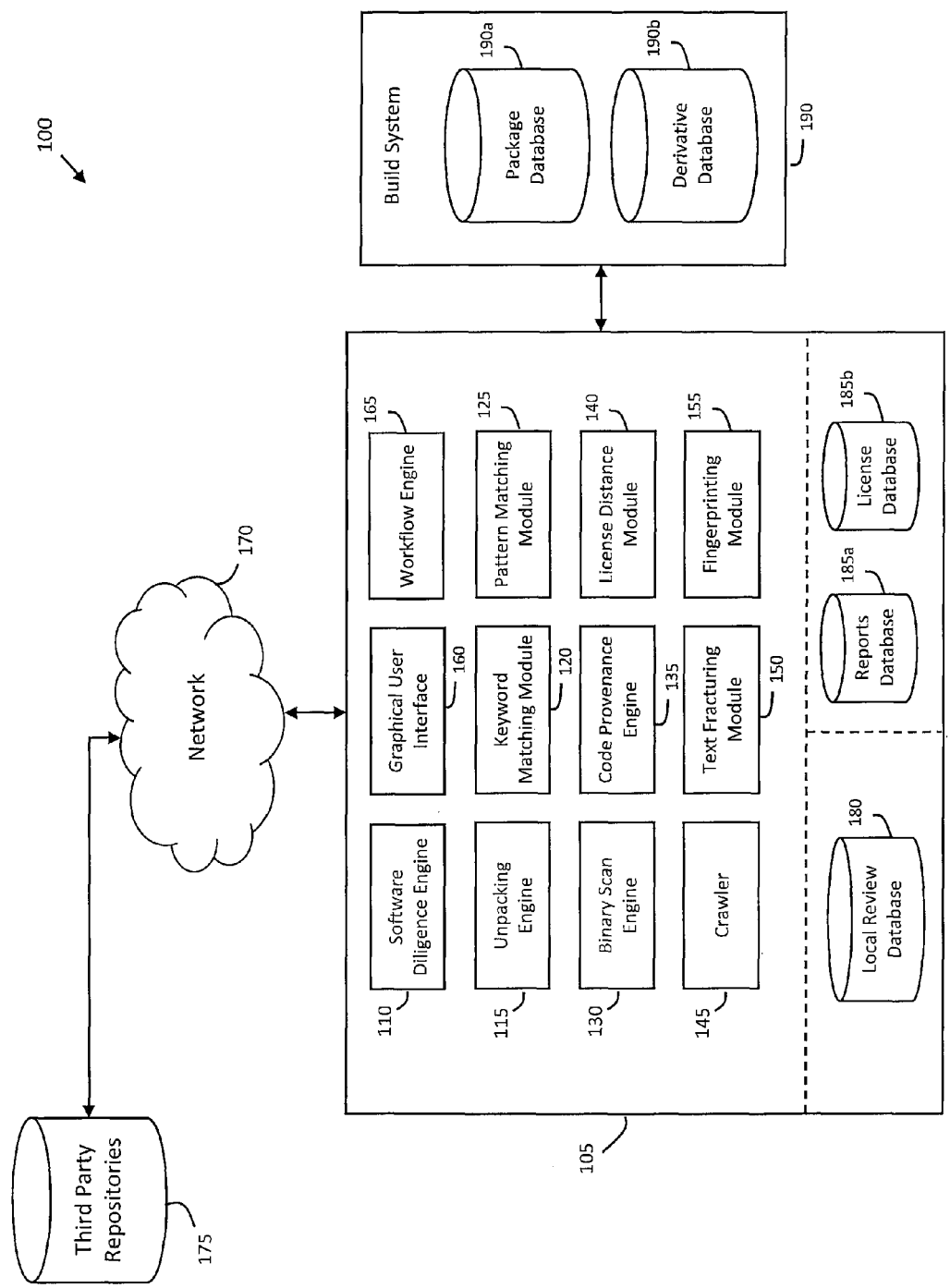
FIG. 1a illustrates an exemplary system for performing software due diligence.

According to one aspect of the invention, FIG. 1a illustrates an exemplary system 100 for automating software due diligence, wherein software due diligence may generally include reviewing software components for compliance and compatibility with open source licenses, intellectual property (IP) rights, export regulations, or other such issues. In one implementation, the system 100 be integrated with a build system 190 in order to track licenses, risk level, review status, and other compliance issues for software subject to due diligence review. For example, as used herein, software subject to due diligence review may include various packages or other source files defined to be a group or collection of related software components. In one implementation, each package submitted to the build system 190 may be stored in a package database 190a for due diligence review. For example, FIG. 1b may illustrate an exemplary workflow for performing software due diligence review using the system shown in FIG. 1a.

In one implementation, the system 100 for automating software due diligence may include, among other things, a license review system 105 coupled to the build system 190. The license review system 105 may include a software diligence engine 110 configured to review the packages stored in the package database 190a for various compliance issues. For instance, the software diligence engine 110 may be configured to review software stored in the package database 190a to identify references to known open source licenses, external licenses, end user license agreements, or other license references. In addition, the software diligence engine 110 may be configured to review the software stored in the package database 190a to reveal any cryptographic algorithms that may present issues for export controls or regulations (e.g., using cross-references to software known to have export defects).

In one implementation, the license review system 105 may further include a code provenance engine 135 configured to review the software stored in the package database 190a for undocumented or improperly documented source code (including open source and/or closed source, as appropriate). For example, the code provenance review engine 135 may utilize a crawler 145 configured to traverse one or more networks 170 in order to retrieve information relating to third-party software from various third-party repositories 175. As will be apparent, the third-party repositories 175 may include any suitable repositories that contain open source, freeware, shareware, or other public or private software (e.g., SourceForge, Google Code, OpenSUSE, Fedora, Debian, etc.). The license review system 105 may include a package manager that documents a Uniform Resource Locator (URL) for each third-party repository 175 where a package originated, whereby various components of the system (e.g., the crawler 145) may know where to look for updated information. As such, the code provenance engine 135 may compare the software under review to the software retrieved from the third-party repositories 175, which may have known origins and license terms, in order to analyze the reliability of license information for software that may otherwise lack proper documentation.

To accomplish the aforementioned tasks (or other tasks that may be associated with software due diligence review), a license database 185b may be configured to store information that describes various software licenses, and a reports database 185a may be configured to store information that describes results of software due diligence review. In one implementation, the licenses may be described in the license database 185b according to a condensed license description syntax, which may contain a limited number of verifiable attributes for known software licenses. The license description syntax may be designed to provide precision and lack of redundancy in the description of software licenses. In particular, a given entry in the license database 185b may be used to uniquely describe one version of a software license, even for licenses that may have multiple names known to be in circulation (e.g., because of the existence of multiple sources and/or authors for the license). Thus, in one implementation, the reports database 185a and the license database 185b may be provided as a self-contained unit, which may optionally include a binary IP database. As such, in one implementation, the reports database 185a and/or the license database 185b may be established as a global license database (or library), which may be made available for public, private, or other forms of access, as will be apparent (e.g., the license database 185b may be accessed for free, on a subscription basis, or in other ways).

In one implementation, the license description syntax may include one or more attributes for describing the various software licenses in the license database 185*b*. In particular, a given software license described in the license database 185*b* may be associated with some or all of the following attributes of the license description syntax:

Full Name: Provides a descriptive and distinct full name for the license, as drafted by the initial author, which may further include a version number and/or timestamp, as may be appropriate (e.g., "GNU General Public License version 2").

Short Name: Provides a truncated name for the license, which may be condensed for practical human usage, while also being distinct across the entire namespace. Each short name contains a name element, and each short name further contains a version identifier and/or a descriptive identifier (e.g., "GPLv2" for "GNU General Public License version 2", wherein "GPL" represents the name element and "v2" represents the version identifier).

Name Element: The name element of a license short name always begins with an upper case letter, although one or more lower case letters may precede the name element as descriptive identifiers (described below). The name element may include one English word, or an abbreviation that includes a minimum number of letters (e.g., three or more letters, such as the "GPL" abbreviation for "GNU General Public License"). The name element may optionally include one or more hyphens ("-") among the letters, as appropriate (e.g., "Ms-PL" for the "Microsoft Public License").

Version Identifier: For licenses having more than one version, a lower case "v" may be used to separate the name element from the version number (e.g., "GPLv2"). The version identifier may further contain dots (".") and/or lower case letters among its digits, as appropriate (e.g., "MPLv1.1" for version 1.1 of the Mozilla Public License).

Descriptive Identifiers: Various descriptive identifiers may be defined to denote specific information describing a license, and the descriptive identifiers may precede or follow the name element of a license short name. When a license short name has a descriptive identifier, using a version identifier may be considered optional. Examples of descriptive identifiers may include "c" as a prefix denoting a standalone license clause, "a" or "any" as a prefix denoting an aggregation class of similar variants, a slash character ("/") appended to the short name also denoting an aggregation class, or other identifiers may be defined, as appropriate.

Full Text List: Provides known Uniform Resource Locators (URLs), expected to be persistent, which contain the full text of the license. In one implementation, the URLs in the full text list may be ranked according to a level of authority, and in one implementation, a particular one of the URLs may be designated authoritative (e.g., "http://www.gnu.org/licenses/gpl-2.0.html"). In one implementation, one or more of the URLs in the full text list may reference local storage in order to provide the desired persistence.

Alias List: Provides alternative names and/or aliases that may be known for the license (including references to the alternatives and/or aliases within the license database 185*b*), along with respective origins and uses of the alternative names and/or aliases.

Classification Path: Provides a hierarchical path for classifying or otherwise organizing various software licenses (e.g., "GNU/GPL/1.0" may be used as a classifying path for GPLv1, "GNU/GPL/2.0" may be used as a classifying path for GPLv2, etc.).

Integer Identifier: Provides a numeric integer for uniquely identifying the license. The integer identifier may be used in addition to a short name, or may optionally be used instead of a short name (e.g., to eliminate language barriers or other issues that a natural language full name and/or short name may impose).

Inclusions List: Provides references to licenses that are entirely included within the text of the license being described. Licenses referenced in the inclusion list may not have clauses that do not appear in the license being described, nor can licenses referenced in the inclusion list have any terms or clauses that conflict with the license being described. Questionable cases may be excluded from being listed among the inclusions.

Complex License List: Provides a list of licenses considered synonymous, equivalents of, or otherwise related to the license being described, wherein each complex license is expressed using one or more elements of the license description syntax as a vocabulary. Complex licenses may include choice licenses (e.g., dual licenses, triple licenses, etc.), mixed licenses, modified licenses, or other interactions among a plurality of licenses.

Choice Licenses: Require a user to choose at least one license from a given list that includes a plurality of licenses. A logical OR operator may be used in an expression to represent a choice license (e.g., a pipe symbol ("|"), the word "or", or another operator). For instance, an exemplary choice license may require the user to choose one of "GPLv2" (or any later version thereof) or "MPLv1.1" (i.e., effectively a triple license). Assuming that GPLv2 has an integer identifier of "7", that MPLv1.1 has an integer identifier of "32", and that the character "+" permits later variants of a given license, the choice license may be expressed as "GPLv2+ or MPLv1.1" or "7+|32".

Mixed Licenses: Require a user to concurrently comply with the terms of a plurality of licenses. A logical AND operator may be used in an expression to represent a mixed license (e.g., an ampersand symbol ("&"), the word "and", or another operator). For instance, an exemplary mixed license may require concurrent compliance with the GNU Lesser Public License version 2.1 (assume an integer identifier of "641"), the 3-Clause BSD License (assume an integer identifier of "13"), and the GNU Free Documentation License version 1.2 (assume an integer identifier of "163"). This mixed license may thus be expressed as "LGPLv2.1 and BSD3c and FDLv1.2" or "641 & 13 & 163". A comma may also be used to provide the same logical meaning as "&" or "and", which may be useful when un-mixing a license at a software package level (i.e., where a mixed license refers to a software package as a whole, a comma may provide a clear separation point to simplify revision of the mixed license after the package has been disassembled into separate components).

Aggregation Classes: Combinations of choice license schemes (e.g., dual licenses, triple licenses, etc.) and/or mixed license schemes can often exist for a given package. As such, various symbols may be used to disambiguate operator precedence, such as parenthesis "(", "{", "[", and "}", "]", ")" (i.e., different styles of parenthesis may be used for readability). Alternatively, one or more rules may define default operator precedence conditions (e.g., "&" may take precedence over "or", and vice versa).

Additions, Exclusions, or Modifications: The logical AND operator may be used to add individual clauses to a license, or to add individual licenses to a license class. The logical "without" operator (e.g., "\") may be used to remove individual clauses from a license, or to exclude individual licenses from a license class. The logical "modify" operator (e.g., "~") may be used to modify the meaning of a clause or a license (e.g., to add additional permissions or to counteract obligations or other terms associated with a particular license).

Clause Identifiers: Individual clauses may be identified using a clause identifier, which may be prepended or appended by a "c". The identifier itself may include a short name of a specific license to represent all clauses of the license (e.g., cBSD may represent all clauses of the BSD-License) or a single clause of the license (e.g., BSD4c may represent clause 4 of the BSD-License). The identifier may also comprise a generic name without referencing a specific license (e.g., cADV may represent an advertising clause). In one implementation, the prepended or appended "c" may be omitted from the short name of a license clause when used directly after the without operator ("\") or when used after the modify operator ("~") in cases where the modify operator has been used to add additional permissions or to counteract obligation clauses in a license. In one implementation, omitting the prepended or appended "c" may be permitted if the omission does not cause any potential ambiguity or misinterpretation.

Equivalents: Various complex licenses may be well known in their own right (e.g., when complex licenses are prominent enough to have a set of known attributes or characteristics). Thus, some complex licenses may have an "Equivalents" attribute that identifies alternative expressions for the same license. For example, the BSD License originally had four clauses, but the advertising clause has been officially rescinded (i.e., the advertising clause can be omitted without raising compliance concerns). As such, an equivalent expression for the 4-Clause BSD License may be "cBSD & cADV", which would thus refer to the 3-Clause BSD License with the advertising clause added. In another example, a clause is often added to the original Artistic License to permit a special form of embedded aggregation, whereby an expression combining the original Artistic License with an embedded aggregation clause may essentially operate as an equivalent to version 2.0 of the Artistic License.

Public Comments: Provides cross-references to public reviews and comments for a license, which may originate from a newsgroup, a web page, a mailing list, a blog, or another public forum or source. In one implementation, the public comments attribute may be implemented as a discussion wiki to allow for posting of additional comments without implying that the comments are authoritative.

Additional Attributes: Provides extensibility where additional attributes may be defined to describe the license. In one implementation, the public comments attribute may be used as a resource to determine additional attributes of public interest (e.g., frequently recurring terms may be identified as candidates for additional attributes). The additional attributes may be defined as Boolean variables to provide a simple binary setting (e.g., Y/N, 1/0, etc.), and in one implementation, the setting for the attributes may optionally be permitted to remain undefined. In one implementation, additional attributes may be phrased as questions that can be answered from the license text (e.g., "Patent Clause: Does the license text contain the word 'Patent' or reference any patent numbers?", Simple License: Does a full text version of the license exist in less than 200 words?", "Termination Clause: Does the license text contain a termination date?", "OSI Approved: Is the license listed at http://opensource.org?").

In one implementation, short names and integer identifiers may be restricted to one use within a namespace for the license database 185b. For example, when the authoritative text associated with a given license short name or integer identifier falls into disuse or undergoes substantial revision, a new short name and/or integer identifier may be assigned to the license (i.e., the original short name and/or integer identifier would remain associated with the original authoritative text). In one implementation, whether changes or revisions to authoritative texts are considered substantial may depend on whether the associated license is uniquely identified with a short name or an integer identifier. In particular, changes may be more frequent (and thus more likely to be substantial) if the license is uniquely identified with an integer identifier rather than a short name (e.g., for ease of reference, preserving familiar short names may be preferred if changes to the authoritative text are relatively minor).

Additionally, in one implementation, the software diligence engine 110 may include a compiler configured to perform various operations on the license description syntax. For example, the compiler may be configured to perform operations that include, among other things, translation between a short name and an integer identifier, translation between word and symbol operators, translation between the license description syntax and readable English suitable for human consumption, optimization of logical expressions for size and readability, and/or evaluation of logical expressions to identify equivalences and inclusions.

In one implementation, the license review system 105 may facilitate identification of various software due diligence problems, including review for compliance and compatibility with open source or other software licenses, as well as compliance with export regulations, internal policies, or other controls. For example, when the license review system 105 reviews software incorporating open source, the license review system 105 may harvest various forms of information from the software, including any licenses declared therein, an author of the software, a year in which the software was created, or other information that may be relevant to software due diligence. The license review system 105 may then check for permissions and obligations associated with various attributes of the declared open source licenses, contradictions or relaxations with regard to other license declarations, or other information associated with open source licenses (e.g., as defined using the license description syntax). As such, the license review system 105 may then draw inferences as to whether a potential compliance problem exists (e.g., using regular expressions and wildcard pattern matching, among other techniques).

In one implementation, the license review system 105 may create reports of software reviews and store the reports in a reports database 185a. In addition, the license review system 105 may associate each reviewed file, package, binary object, or other software component with a reference to the corresponding report. In one implementation, the reports of the software review may identify any licenses that may be present in the reviewed software, identify risk levels associated with any compliance issues that may have been identified for the software, and identify developers, managers, reviewers, or other users responsible for the software. The reports may also provide version tracking for the reviewed software, wherein a version number and a reference number may be recorded whenever a new file, package, binary, or other software component is detected in the build system 190 or other databases. When the version number and/or reference number changes for previously reviewed software, the license review system 105 may schedule an updated review for the software.

In one implementation, a compliance officer or other authorized reviewer may direct, manage, or otherwise participate in a due diligence review process for particular software components using a workflow engine 165 (e.g., to remediate any issues that may be identified in the software reviews, to review reports describing the software reviews, etc.). For example, in one implementation, the workflow engine 165 may be configured to track one or more workflows and/or sub-workflows that define the due diligence review process (e.g., a SWAMP workflow that may include various different people working on different process steps). As such, the compliance officer or other authorized reviewer may monitor the workflow to manage remediation of the compliance issues. For example, in one implementation, the workflow engine 165 may be based on the SWAMP workflow processing platform sponsored by Novell and SourceForge, as described in further detail at swamp.sourceforge.net. Thus, in one implementation, the SWAMP workflow processing platform may be used by the workflow engine 165 to build a web-based interface from a workflow definition file created for a particular software component under review. The web-based SWAMP workflow may then be displayed via the graphical user interface 160, wherein the SWAMP workflow may guide different users through the remediation process, send notifications where required, assemble overview pages over running processes, schedule time-critical workflow paths, or provide other features useful in managing the review process for software under review.

As indicated above, the license review system 105 may be integrated into a package build system 190, and may be configured to use the software diligence engine 110 in an automated batch mode and/or a manual mode. For example, whenever a new software package is compiled or otherwise submitted to the build system 190, the software diligence engine 110 may automatically schedule a batch mode run to review the new software package for compliance issues, construct a report for the batch mode review, and estimate a risk level for the reviewed software package. During the batch mode run, the software diligence engine 110 may scan software to identify, among other things, information relating to open source licenses, patent, copyright, trademark, and other intellectual property usage, e-mail addresses (e.g., to identify a developer or project manager), URLs, and indications of cryptography (e.g., to comply with export regulations).

In one implementation, any new packages may be initially associated with a status of "candidate", wherein candidates may initially be blocked from distribution until the package has been reviewed. If the candidate package is determined to be in compliance with open source licenses, export regulations, and other requirements, the package may be associated with a status of "production". In one implementation, compliance officers or other authorized reviewers may be permitted to override the initial block and manually allow initial distribution, in which case the candidate package's status may be changed to production. For example, a user may request a manual override to permit distribution for a given candidate package, and any packages for which such a request has been made may be added to a lawyer review queue for further review in the manual mode. Compliance officers or other authorized reviewers may then manually review the packages in the lawyer review queue, shift priorities within the queue, or otherwise manage manual review for the packages in the queue.

Additionally, in one implementation, a batch mode run may automatically be scheduled whenever the license review system 105 detects an update to an existing package in the build system 190. If the risk level for the updated package exceeds a predetermined product-specific threshold following the updated review, the status of the updated package may return to candidate, thereby blocking the update from distribution. However, in a similar manner as permitted for new packages, a compliance officer or other authorized reviewer may manually review the updated software to override the block and return the package to production status.

In one implementation, information used during the software due diligence review process may be retrieved from the build system 190 and downloaded to a local review database 180. For example, in one implementation, the local review database 180 may be stored locally on a file system associated with the license review system 105, and the local review database 180 may support locking or otherwise synchronizing with information contained in the build system 190. In one implementation, the information retrieved from the build system 190 and downloaded to the local review database 180 may include, among other things, license information from the license database 185b, package information from the package database 190a, and/or report information from the reports database 185a. In this manner, the license review system 105 may be configured to perform due diligence review. using information stored in the local review database 180, which may reduce communication or other processing latencies while also ensuring that the information stored in the build system 190 remains synchronized with any changes that may occur during local processing.

In one implementation, after the software diligence engine 110 reviews a particular package or software component for compliance issues, a report detailing the results of the review may be constructed and stored in the reports database 185a. A compliance officer or other authorized reviewer may then retrieve and review the report (e.g., using a graphical user interface 160), and the compliance officer or other authorized reviewer may review the results in the report, adjust the risk level contained in the report, and implement package-specific rules or policies to govern remediation of any issues (e.g., notifying the developer of the potential issue, restricting use based on the severity of the issue, etc.). Relevant rules and/or policies may also be attached to database entries associated with remediated software in order to prevent recurrence of the issue in subsequent or related versions of the software.

In one implementation, reports stored in the reports database 185a may expose a degree to which a particular package was covered during the batch mode review of the package. In cases where a report indicates that the batch mode review only achieved partial coverage for a reviewed package, a manual review may be required to achieve full coverage. As such, the interactive process constructing a report for reviewed software may be used to expand the information contained in the license database 185b to ensure that subsequent batch mode reviews will have full coverage for the same or related versions of the package (e.g., uncovered patterns in a given package may be analyzed and associated with a description in the license database 185b, whereby the patterns may be available in subsequent batch mode runs). In addition, the compliance officer or other authorized reviewer may examine dependency chains for a reviewed package, and may review any additional dependent packages in manual mode when coverage is lacking for the dependent packages.

In one implementation, when sufficient coverage has been achieved for a reviewed package, the compliance officer or other authorized reviewer may export license and risk level information to the package database 190a and may further approve or disapprove the package for distribution within any products that may incorporate the package. In one implementation, when distribution of a particular package is disapproved, the compliance officer or other authorized reviewer may send a description of the issue to one or more developers responsible for the software. Similarly, at earlier stages of the manual review process, the compliance officer or other authorized reviewer may send out requests for information, report defects to the development team, or otherwise coordinate aspects of the review process. The license review system 105 may be configured to track communication and any other aspects of the manual review and defect resolution process, which may then be stored for subsequent review.

Figure 1B:
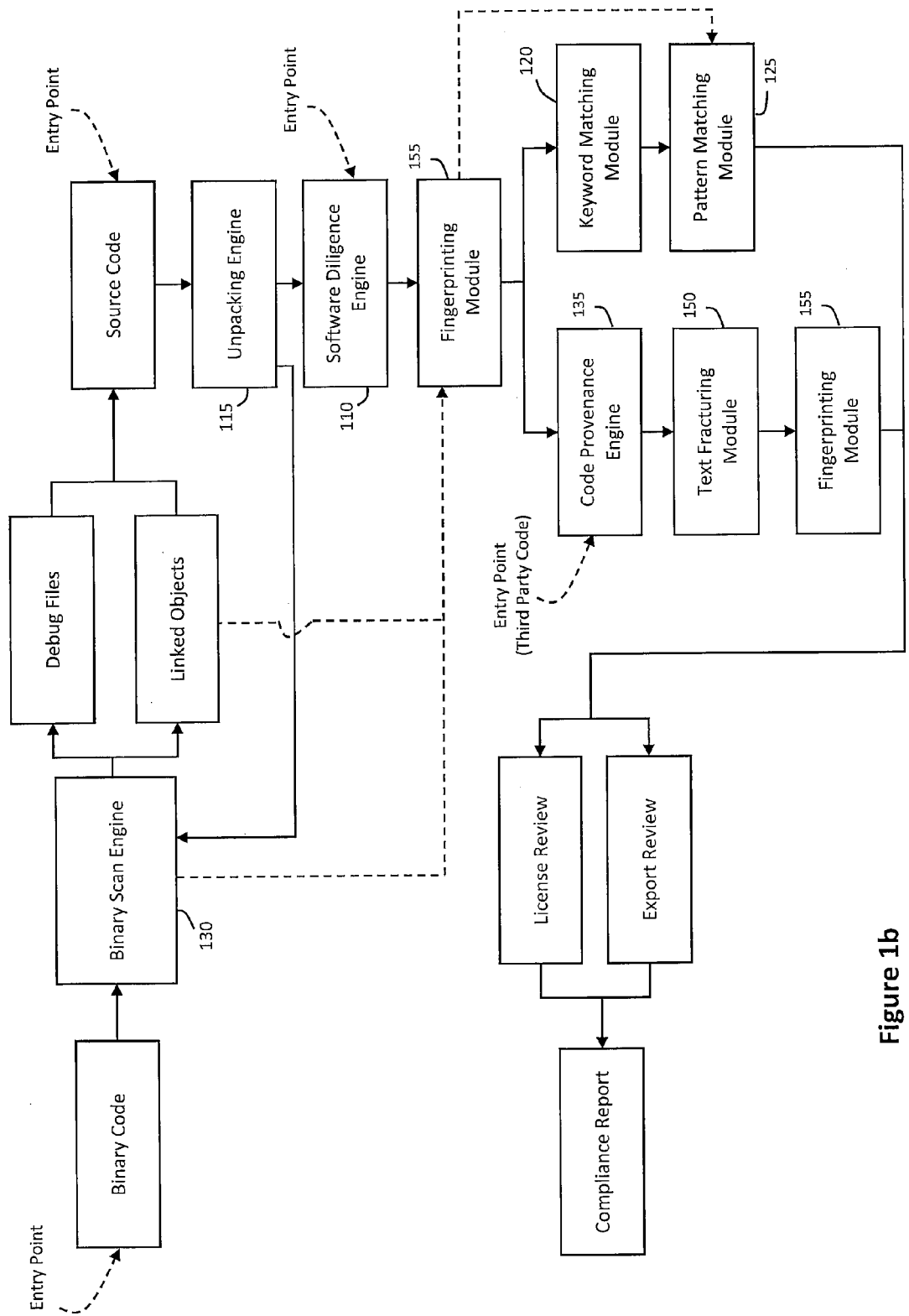
FIG. 1b illustrates an exemplary software due diligence workflow using the system shown in FIG. 1a, according to one aspect of the invention.

In one implementation, to automatically perform due diligence review for software packages submitted to the build system 190, the license review system 105 may include a binary scan engine 130 capable of extracting information from various binary objects. For example, as shown in FIG. 1b, whenever a package or other binary file passes through the build system 190, the build system may be configured to create debug information that may be used for troubleshooting if the software should later crash or otherwise experience problems. In one implementation, the debug information may be stored in a derivatives database 190b, wherein the debug information may be maintained in a debug file in the derivatives database 190b separately from the binary itself. Thus, in one implementation, the binary scan engine 130 may search the debug information stored in the derivatives database 190b to match one or more source files to the binary (i.e., the debug file may identify the source files that did or did not contribute to the binary). Thus, in one implementation, the binary scan engine 130 may use debug information contained in one or more debug files in order to search for derivatives or other dependencies of the software.

Furthermore, in one implementation, the binary scan engine 130 may be configured to scan a binary representation of a package to further identify dependency information. For example, in one implementation, the identified dependency information may include linkable objects that were exported by the package or source binary, as well as statically linked objects included from other packages and dynamically linked objects that reference other packages. The binary scan engine 130 may use the dependency information to generate or otherwise update a component dependency tree for the package or other binary, and the component dependency tree may provide information identifying source code associated with the binary. In one implementation, the component dependency tree or other dependency information may be stored in the derivatives database 190b and/or associated with the package in the package database 185b in order to make the dependency information available to the software diligence engine 110.

In one implementation, the software diligence engine 110 may be configured to review one or more source code packages for various compliance issues. For example, as shown in FIG. 1b, the binary scan engine 130 may identify any source code packages that may be associated with a binary object and then provide the identified source code packages to an unpacking engine 115. Additionally, as further shown in FIG. 1b, one or more source code packages or other software to be reviewed may provided directly to the unpacking engine 115 (e.g., via the package database 190a). In one implementation, the unpacking engine 115 may be used to expose plain text information in either the batch review mode or the manual review mode. Thus, as described in greater detail below, the unpacking engine 115 may generally be configured to feed plain text information to the software diligence engine 110 for any software under due diligence review.

In one implementation, the unpacking engine 115 may be configured to recursively unpack source code files as deeply as possible, and further to derive metadata describing the unpacked source files (e.g., package name, version, release, etc.). For example, the unpacking engine 115 may handle source code packages (e.g., RPM packages), compressed or archived files (e.g., TAR, ZIP, JAR, or other archive files), partially unpacked inputs (e.g., a directory that contains a spec file, patches, TAR archives, etc.), or any other suitable input that may be associated with a plurality of source files. Furthermore, a particular source code package, archive, or other collection of source files may include software at various different levels (e.g., in a hierarchical directory or tree), and the unpacking engine 115 may recursively unpack the software until the software has been unpacked at all of the different levels. After deriving metadata or other information relating to the unpacked source files, the unpacking engine 115 may be configured to store the derived metadata or other information in the derivatives database 190b.

Accordingly, in one implementation, the unpacking engine 115 may recursively unpack source code packages, archives, or other software collections into one or more source files. The source files may generally include code-based binary files, non-code binary files, source code files, or various other types of files. As described above, the unpacking engine 115 may derive metadata describing the unpacked files (e.g., package names, version numbers, etc.), and the metadata may be stored in the derivatives database 190b. In one implementation, the derived information may be used to determine an appropriate technique for exposing plain text information in the underlying unpacked files. For example, in one implementation, the metadata may be derived from a .spec file for a package, wherein the .spec file may identify information for configuring the package, patches to apply to the package, files to install for the package and locations where the files are to be installed, and system-level activity that occurs before and/or after installing the package. In other examples, the metadata may be derived from other sources, including a top-level directory or archive name, a suffix or magic header for the file, a user input, or another suitable source, as will be apparent.

In one implementation, the unpacking engine 115 may determine a file type for each unpacked file based on the metadata or other information derived for the unpacked source files. The unpacking engine 115 may then take appropriate action to extract plain text information from the unpacked file based on the file type. In one implementation, for example, the unpacking engine 115 may post-process any unpacked files that have a file type with a well known textual representation in order to expose plain text information for such files (e.g., Portable Document Format (.pdf) files, PostScript (.ps) files, HyperText Markup Language (.html or .htm) files, etc.). In addition, for binary files that cannot be unpacked further, the unpacking engine 115 may sort the leftover binary files into code-based and non-code binaries. The code-based binaries (typically .dll and .exe files) may be identified as likely including or referencing source code, and the unpacking engine 115 may therefore report the code-based binaries to the binary scan engine 130 for further analysis (but excluding any binaries that the binary scan engine 130 may have previously analyzed). The non-code binaries (e.g., image files, raw data, etc.) may be identified as not including or otherwise referencing source code, and the non-code binaries may therefore be skipped or otherwise discarded from the further processing to be described in further detail herein. However, it will be apparent that other components may be used to further process the non-code binaries for various other due diligence issues (e.g., the non-code binaries may be forwarded to a binary IP comparator engine that is configured to handle graphical trademarks, artwork copyrights, or other IP issues).

Thus, in operation, the unpacking engine 115 may recursively unpack software to be reviewed in order to feed plain text information to the software diligence engine 110. In particular, to prepare the software for due diligence review, the unpacking engine 115 may identify various source files included in the software, discard any non-code binaries, report any code-based binaries with unknown dependency information to the binary scan engine 130, and expose plain text information for any files that have known textual representations (including source code text in addition to .pdf, .ps, .html, or other files with known plain text representations). Further, for code-based binaries that have previously passed through the binary scan engine 130, the unpacking engine 110 may be configured to analyze component dependency trees, linked objects, debug files, or other dependency information to identify relevant source files and extract plain text information, as appropriate.

In one implementation, the unpacking engine 115 may then feed the extracted plain text information to the software diligence engine 110. For example, as shown in FIG. 1b, the software diligence engine 110 may receive plain text source code from the unpacking engine 115 and/or through a direct submission (e.g., via the package database 190a). Thus, as described in greater detail below, the software diligence engine 110 may generally be configured to manage various aspects of searching the plain text information to locate any text matching one or more interactively learned patterns identified as relevant to due diligence review (e.g., patterns stored in the license database 185b that correspond to known open source licenses, cryptography, patent or copyright usages, etc.)

In one implementation, the software diligence engine 110 may be configured to invoke a fingerprinting module 155 in order to calculate a unique file fingerprint for each binary and/or unpacked source file under review. For example, the unique file fingerprint may include a hash value calculated using the Message-Digest algorithm 5 (i.e., an MD5 checksum). The software diligence engine 110 may compare the unique file fingerprint calculated for each binary and/or unpacked file to existing file fingerprints in the package database 190a to determine whether the associated software has been previously reviewed. If the unique file fingerprint for a particular binary and/or unpacked file under review exists in the package database 190a, the corresponding binary or unpacked file may be identified as already having been reviewed. As such, information relating to the prior review may be retrieved (e.g., from the reports database 185a) and associated with the particular binary and/or unpacked file, whereby the software diligence engine 110 may use the unique file fingerprint to identify possible shortcuts for avoiding duplicative review. Moreover, identifying prior reviews that contain the unique file fingerprint may indicate that the software was reviewed in connection with one or more other packages (e.g., another package may contain an exact copy of the binary or other file under review). In a similar respect, the binary scan engine 130 may invoke the fingerprinting module 155 to determine whether a particular binary has been scanned previously, in which case the relevant dependency information may be retrieved from the derivatives database 190b.

In one implementation, the software diligence engine 110 may further determine whether any new patterns relevant to due diligence review were added to the license database 185b since the unique file fingerprint was generated for a given binary and/or unpacked source file. For example, when the fingerprinting module 155 calculates the unique file fingerprint for a particular binary or other file, a timestamp may also be calculated to indicate when the file fingerprint was created. If any new patterns relevant to due diligence review were added to the license database 185b after the timestamp associated with a particular file fingerprint, the new patterns may be ignored if the software diligence engine 110 were to employ the shortcut described above. Thus, in one implementation, a compliance officer or other authorized reviewer may be permitted to override the file fingerprint shortcut, or the software diligence engine 110 may automatically re-review the software upon determining that one or more new patterns have been added to the license database 185b after the timestamp associated with the particular file fingerprint. In this manner, the review for previously reviewed software may be refreshed to account for changes since the previous review.

In one implementation, the software diligence engine 110 may be configured to search unpacked source files to identify one or more keywords that may be relevant to due diligence review. In particular, the software diligence engine 110 may invoke a keyword matching module 120, which may search the plain text representation of each unpacked file to identify one or more strings and/or sub-strings that match entries in a predefined list of keywords. For example, in one implementation, the list of keywords may contain terms, vocabulary, or other information considered likely to appear in legal language or other contexts relevant to due diligence review, while also being generally uncommon or otherwise unlikely to appear within source code outside such contexts (e.g., "license", "copyright", "distributed", etc.).

In one implementation, the keyword matching module 120 may be used to identify keywords contained in source files in either the batch review mode or the manual review mode, and the keyword matching module 120 may operate in either a normal mode and/or a raw mode when searching textual representations of source files. In the normal mode, the keyword matching module 120 may pre-process an incoming file under review to prune a search space associated with the file. For example, in the normal mode, the keyword matching module 120 may be configured to remove various special characters from the file under review (e.g., punctuation, newline characters, etc.), while in the raw mode, the keyword matching module 120 may be configured to search the file without pre-processing (i.e., with special characters included).

In one implementation, the keyword matching module 120 may be configured to identify keywords in a source file in a generally over-inclusive manner, whereby a set of keywords identified in a particular source file may include various positive matches, including both true and false positives. As such, the keyword matching module 120 may be configured to identify various different types of keywords in a manner that minimizes false negatives (i.e., the identified keywords may be over-inclusive to avoid incorrect compliance determinations due to false negatives, whereas false positives can be remediated in other ways).

In one implementation, the keyword matching module 120 may identify one or more of normal keywords, negative keywords, weak normal keywords, and/or weak negative keywords within a source file under review. In one implementation, for a particular string or sub-string to be identified as matching a keyword, the entire string or sub-string may be required to appear on a single line (i.e., a match may not be permitted to span line boundaries within the file). In addition, it will be apparent that the keywords to be identified using the keyword matching module 120 may not necessarily be limited to real words, in that keywords may generally include any suitable combination of words, punctuation, truncation operators, or other characters, operators, or criteria generally used to create regular expressions.

In one implementation, normal keywords may generally indicate relevant legal language or other vocabulary associated with software due diligence issues (e.g., "license", "copyright", "distributed", "cryptography", "warranty", etc.), while negative keywords may be used to negate normal keyword matches. For example, negative keywords may be associated with a threshold proximity, wherein the negative keyword effectively masks any normal keywords appearing within the threshold proximity of the negative keyword. The threshold proximity for a particular negative keyword may include a threshold number of lines (e.g., a threshold of zero may negate normal keywords appearing on the same line as the negative keyword, a threshold of one may negate normal keywords appearing on the prior, same, or subsequent line with respect to the negative keyword, etc.). Additionally (or alternatively), the threshold proximity for a particular negative keyword may include a threshold number of words (e.g., a threshold of zero may negate normal keywords appearing immediately adjacent to a negative keyword). For example, negative keywords may be used for certain well known phrases to cancel out excessive false positives for commonly used phrases, such as "distributed algorithm" or "distributed comput" to negate false positives associated with the keyword "distributed" often found in references to GPL and/or "Lesser" GPL (LGPL).

In one implementation, weak normal keywords may function in a similar manner as normal keywords, except that weak normal keywords alone may be considered insufficient to trigger a match (e.g., "used", "modified", "any purpose", etc.). Instead, weak normal keywords may each be associated with a value (e.g., a fraction between zero and one), wherein a weak normal keyword may increase a normal counter according to the associated value. Thus, weak normal keywords may only trigger a match when surrounded with further keywords to the extent of causing the normal counter to exceed a first threshold value for a match (e.g., one or another value). Weak negative keywords may be similar in function to negative keywords, except that weak negative keywords alone may be considered insufficient to negate a match. Rather, weak negative keywords may each be associated with a value (e.g., a fraction between zero and one), wherein a weak negative keyword may increase a negative counter according to the associated value. If various occurrences of weak negative keywords cause the negative counter to exceed a second threshold value, the values associated with the weak negative keywords may be subtracted from the normal counter. Thus, weak negative keywords may only negate matches to the extent of causing the negative counter to exceed the second threshold value and further causing the normal counter to remain below the first threshold value (e.g., one or another value).

In one implementation, the list of keywords may be stored in the license database 185b, and the keyword matching module 120 may associate each of the keywords stored in the license database 185b with one or more statistics that provide a quality metric for each particular keyword. For example, subsequent manual or automated review of the keywords may be tracked to develop statistics that identify one or more keywords that most frequently result in false positives (e.g., if the keywords are typically skipped during manual or automated interactive runs). The keywords most frequently resulting in false positives may therefore be identified as bad keywords, wherein such information may be considered when the list of comparison keywords is refined or otherwise optimized Thus, in one implementation, the list of keywords stored in the license database 185b may be dynamically updated as necessary to add new keywords, remove bad keywords, make certain keywords weak, and otherwise maintain the list of keywords as may be appropriate.

In one implementation, if the keyword matching module 120 does not identify any normal keywords or weak normal keywords in a particular file, or if the counter remains below the threshold value, or if negative keywords negate each of the normal keywords identified in the file, the file may be marked as not containing any keywords likely to be relevant to due diligence review. As such, the file may be skipped in subsequent stages of the due diligence review process (although the code provenance engine 135 may still analyze the file for improper license declarations or other improper documentation).

In one implementation, if the keyword matching module 120 does identify one or more normal keywords and/or weak normal keywords in a particular file, or if the counter otherwise exceeds the threshold value, a pattern matching module 120 may match the keywords to patterns stored in the license database 185b. For example, in one implementation, the license database 185b may contain several ten-thousands of text patterns, each of which may include an excerpt of legal language (as found in source code). The text patterns may generally include any suitable language or string considered relevant to software due diligence, and each text pattern may further refer to a software license (e.g., GPL, LGPL, etc.) or another entry in the license database 185b (e.g., a cryptographic algorithm).

As indicated above, each of the text patterns stored in the license database 185b may generally include a text string considered relevant to software due diligence. The pattern matching module 125 may typically require a verbatim match between a text pattern and a sub-string in a file under review, although certain text patterns may contain wildcard sections to compensate for information expected to change (e.g., a text pattern associated with a copyright header may contain wildcard sections to compensate for a change in name, year, etc.). As such, the pattern matching module 125 may generally avoid fuzzy text pattern matches in order to minimize false automatic license attribution, as verbatim matches may have a higher degree of precision. For example, text patterns derived from version 2.0 and 3.0 of the GPL license may only have one different character (i.e., "GPLv2" and "GPLv3" differ only by one character, a "2" versus a "3", wherein a substantial match on a GPLv2 text pattern could be problematic if no corresponding GLPv3 text pattern exists).

Moreover, in one implementation, the text patterns stored in the license database 185b may include one or more negative text patterns, which may be used to cover keywords in a context determined to be irrelevant to legal interpretation. For example, the keyword matching module 120 may identify the keyword "distributed" within the source code text of "int distributed=0; // do not connect to the network". When a compliance officer or other authorized reviewer considers the context in which the keyword was identified, the foregoing source code text may be added to the license database 185*b* as a negative text pattern that covers the keyword without resulting in a false positive.

In one implementation, whenever the keyword matching module 120 identifies one or multiple keywords in a file, the pattern matching module 120 may match a pre-processed version of the file against the text patterns in the license database 185*b*. For example, in one implementation, the file may be pre-processed to normalize comment styles and whitespace usage, among other things, in order to minimize pattern match irregularities resulting from non-substantive concerns (e.g., coding style). The pattern matching module 120 may then match all of the text patterns in the license database 185*b* against the pre-processed version of the file (e.g., using a massive parallel search algorithm based on spam-filter technology).

In one implementation, the pattern matching module 125 may search for one or more text patterns that cover keywords contained in the file (i.e., an entire text pattern appears within the file, wherein the text pattern includes the keyword). Each keyword covered by one or more text patterns may be marked done, and any remaining uncovered keywords may be flagged for manual review. Furthermore, if a particular keyword is covered by a plurality of text patterns, the pattern matching module 125 may be configured to select one of the plurality of text patterns. In one implementation, the pattern matching module 125 may attempt to use a single pattern to cover as many keywords as possible, and may therefore select a largest of the plurality of text patterns. In particular, larger text patterns may often incorporate various smaller text patterns, and the larger text pattern may therefore convey more information than the sum of several smaller text patterns. For example, a particular text pattern may include an introductory paragraph explaining a license choice, while two subsequent paragraphs may reference mutually incompatible licenses from which to choose. If the introductory paragraph and the subsequent paragraphs were recognized as three individual and distinct matches, the software diligence engine 110 would flag the incompatibility for manual resolution. However, if the introductory paragraph and the subsequent paragraphs were recognized as a single larger text pattern, the license choice would be intrinsically consistent. Thus, the pattern matching module 125 may select a largest text pattern to cover a keyword when a plurality of overlapping matching text patterns are identified.

In one implementation, the pattern matching module 125 may determine whether at least one text pattern covers each of the keywords identified in a file under review. In particular, a text pattern may be determined to cover a given keyword when the keyword appears within a text string that matches the text pattern. Additionally, in one implementation, if a wildcard portion of the text pattern matches the keyword, the text pattern may be determined to not cover the keyword (i.e., keywords that match because of wildcards should be manually reviewed to ensure that the keyword is correctly covered). If the pattern matching module 125 determines that one or more keywords have not been matched to a text pattern, a number of the unmatched keywords may be recorded and shown within a report for the file containing the unmatched keywords. In one implementation, the report may further contain information that provides a location of the unmatched keywords in the file or other information to enable manual review of the unmatched keywords. For example, unmatched keywords may identify new relevant legal language, and as such, the unmatched keywords may be used to create new text patterns, whereby the text patterns in the license database 185*b* may evolve over time based on how keywords are used within legal language that appears in source code.

For example, in one implementation, keywords that remain uncovered after a file has been analyzed using the pattern matching module 125 may be subject to further manual review. The manual review may be used to identify new relevant text patterns, wherein a dialogue window may be presented to a compliance officer or other authorized reviewer through the graphical user interface 160. For each keyword that remains unmatched to a text pattern, the dialogue window may present one or several lines of context around the unmatched keyword. In addition, the dialogue window may allow the compliance officer or other authorized reviewer to browse a list of licenses stored in the license database 185*b*, and the compliance officer or other authorized reviewer may be required to enter a new text pattern that covers the unmatched keyword. For example, to create the new text pattern, the compliance officer or other authorized reviewer may have options that include requesting further context around the unmatched keyword, trimming down the context around the unmatched keyword, inserting wildcards into the new text pattern, or otherwise modifying text that contains the unmatched keyword to create the new text pattern.

In one implementation, the new text pattern may then be associated with a relevant license identifier in the license database 185*b*, or a new license identifier may alternatively be created for the new text pattern, as appropriate. For example, the new text pattern may be recognized as originating from a particular license in the license database 185*b*, whereby a subsequent match to the new text pattern may indicate that a file contains language associated with the particular license. In one implementation, the dialogue window presented to the compliance officer or other authorized reviewer may include a list of potentially relevant license identifiers, which may be selected through the graphical user interface 160. For example, the list of potentially relevant license identifiers may include a predetermined number of best guesses, which may be determined from fuzzy matches between the text containing the unmatched keyword and already existing text patterns. If no suitable fuzzy matches exist (e.g., because all fuzzy matches have a confidence level below a predetermined threshold), the compliance officer or other authorized reviewer may choose from a list of all known license identifiers, or the compliance officer or authorized reviewer may create a new license identifier for the new text pattern. Over time, through the manual process of creating and/or revising text patterns, certain text patterns in the license database 185*b* may fall into disuse as they become redundant in favor of better text patterns. As such, in one implementation, text patterns may include an attribute indicating a degree of use and/or disuse, wherein the attribute may be used to detect and remove obsolete text patterns at regular intervals.

In one implementation, in addition to being reviewed for keywords and text strings that indicate references to one or more licenses in the license database 185*b*, the license review system 105 may include a code provenance engine 135 configured to review software for undocumented and/or improperly documented source code. For example, open source components may typically carry prominent copyright and/or license information, and may liberally point to sources of borrowed code, while closed source (or proprietary) components do not. As such, because the absence of relevant keywords or text patterns in a source file may not necessarily indicate that the source file is free of software due diligence issues, the code provenance engine 135 may be configured to determine whether software actually includes undocumented and/or improperly documented source code (particularly when the software is identified as closed source or proprietary).

For example, in one implementation, the code provenance engine 135 may employ a crawler 145 configured to visit various third-party repositories 175 to download or otherwise obtain information relating to known open source for comparison with source files under review. The code provenance engine 135 may further use a text fracturing module 150 to fracture or otherwise sub-divide the known open source into one or more blocks and/or sub-blocks that are as large as possible without being independently copyrightable (i.e., if the blocks and/or sub-blocks are independently copyrightable, relatively insubstantial modifications may cause the lack of proper documentation to escape detection). Furthermore, the code provenance engine 135 may also use the text fracturing module 150 to similarly fracture or otherwise subdivide source files under review into blocks and/or sub-blocks, which may be compared against the blocks and/or sub-blocks for the known open source. For example, in one implementation, the code provenance engine 135 may use the fingerprinting module 155 to create a unique fingerprint for the blocks and/or sub-blocks of the known open source and the source file under review, wherein a match between the unique fingerprints may indicate whether the source file has undocumented and/or improperly documented source code. In one implementation, if only one match between the unique fingerprints is identified, the single match may be discarded to account for blocks of code that are not copyrightable, while a plurality of matching fingerprints may satisfy a threshold for identifying undocumented and/or improperly documented source code.

In particular, as illustrated in FIG. 1b, source code under review and/or known open source may be provided to the code provenance engine 135 to determine whether the source code under review contains potential legal defects. For instance, the code provenance engine 135 may invoke the text fracturing module 150 to create logical fragments of the source code under review and the known open source code, wherein the logical fragments may be discrete portions of code that are unlikely to be modified (e.g., with logical fragments being defined according to blanks lines, white space, or other language-independent characteristics). As such, the text fracturing module 150 may create the logical fragments in a manner that is agnostic to programming language, whereby the text fracturing module 150 need not be tailored or otherwise modified for different or newly developed programming language syntaxes. Furthermore, fracturing or otherwise subdividing source code in the same manner for both the source code under review and the known open source may result in the logical fragments being the same in both the source code under review and the known open source. The logical fragments for the source code under review and/or the known open source may thus be provided to the fingerprinting module 155, which may compare unique fingerprints of the logical fragments to search for potential latent licensing issues.

In one implementation, after software has been subject to due diligence review, which may include license review and/or export review (as shown in FIG. 1b), a compliance report may be created for the software and attached to appropriate entries in the package database 190a. In one implementation, the reports may include a risk level specific to a given software product to indicate a degree of due diligence risk that a software package or portions thereof may raise. The compliance officer or other authorized reviewer may analyze the reports via the graphical user interface 160 to determine how to handle distribution of a particular package or other software component. For example, if the risk level exceeds a threshold value that indicates a tolerable level of risk, the package may be blocked (or continue to be blocked) from being distributed within the respective software products. On the other hand, if the risk level does not exceed the threshold value, distribution of the package within the respective software products may be allowed (i.e., a blocked software component may be unblocked).

In one implementation, the report for a given software component may also include an indication of whether the software component includes multiple licenses or inter-package relationships, in which case the compliance officer or other authorized reviewer may be required to resolve the relationships among the multiple licenses or packages (e.g., choice licenses may present different issues than aggregate licenses, which require legal expertise to remediate). Furthermore, in one implementation, when the report for a particular software component identifies a license declaration and/or code provenance issue, the license declaration and/or code provenance issue may generally have a level of uncertainty. To assist the compliance officer or other authorized reviewer in assessing the level of uncertainty for a particular software component, a license distance module 140 may be used to assign a license distance representing the reliability of the license declarations (or lack thereof) for the component. For example, the most reliable way to declare a license for a source file is typically to provide a header comment at the beginning of a source file containing the license text or a well known reference to the license. As such, each license declaration and/or code provenance issue in reviewed software component may be assigned a license distance, providing a quality metric to estimate the reliability of the license declarations (or lack thereof).

In particular, the license distance may provide a measure of distance between a software component and the licenses that are (or should be) declared therein. In one implementation, the license distance may be a numeric value that increases with increased uncertainty. Thus, a license declaration having a large license distance may generally be considered to be more unreliable or otherwise uncertain as to whether the component has a proper reference or other declaration for the license. The license distances determined for various license declarations in software under review may then be analyzed to determine the reliability of the license declarations (e.g., license distance values may be added to one another or subject to linear comparisons to provide a measure of certainty (or uncertainty) with respect to the associated license declarations).

In one implementation, the license distance for a particular license declaration (and/or missing or improper declaration) may be determined using one or more rules. The license distance rules may be based on various properties of the software component associated with the license declaration, such as whether the component has a well formed header, multiple headers, or the full text of a license, whether the component is stored in a directory or sub-directory, or other properties of the component. For example, in one implementation, the license distance may be determined according to one or more of the following rules:

If the component is a license file containing the full text of a license, there is no distance between the component and the license, as permissions and obligations for the license text typically differ from covered code. As such, components with this property may be assigned a license distance of zero (0) with respect to the license.

If the component has one well formed header that reliably identifies a particular license, the license distance may be a low value to reflect the reliability of the declaration. For example, in one implementation, components with one well formed header that reliably identifies a particular license may be assigned a license distance of one (1) with respect to the license identified in the header.

If the component has a plurality of headers declaring different licenses, each declaration may be assigned a respective license distance within a predetermined license distance range. For example, in one implementation, the individual licenses may have a license distance of in the range of two to nine (2 . . . 9), wherein the respective distances may depend on characteristics of the declaration (e.g., license declarations closer to the top of the source file or another expected position may receive a lower distance, copyright declarations referring to a more recent year may receive a lower distance, etc.).

If a directory contains a license file having the full text of a particular license, all source files and other components may receive a license distance of no more than ten (10) with respect to the license identified in the license file. In particular, because the source files and other components appear in the same directory as the license file, all of the source files and other components in the directory may be implicitly associated with the license file, even if the source files or other components do not explicitly declare the license. Each subdirectory nesting level between the license file and a particular source file or component may cause one (1) increment in the license distance, to a maximum license distance of nineteen (19). For example, if a source file is nested two subdirectories with respect to the license file, then the license distance for the source file may be incremented by a value of two relative to a source file that appears in the same directory as the license file.

If a directory contains a spec file, a readme, or another prominent file containing a license declaration (i.e., a declaring file), all source files and other components may receive a license distance in a predetermined range with respect to the license identified in the declaring file. For example, in one implementation, the license declaration for each source file or other component in such a directory may have a license distance of in the range of one-hundred to one-hundred nine (100 . . . 109). However, if the declaring file explicitly excludes a list of named files or other components, or if the declaring file otherwise restricts the declaration to a list of named files, then the license declaration may not be valid for certain files within the directory. In such cases, the source files or other components that are not associated with the declaring file would not incorporate the declaration of the declaring file, and therefore would not receive a license distance for the license referenced in the declaring file.

If a component references a licenses via a contains Uniform Resource Locator (URL), the license distance with respect to the referenced license may be based on various characteristics of the URL. In particular, if the URL validly points to full license text, the URL reference to the license may receive a lower license distance, whereas the URL reference may receive a higher license distance if the URL points to a dead link or a valid link that does not contain the full license text. For example, in one implementation, the URL reference to the license may receive a license distance of (40) if the URL validly points to full license text, a license distance of sixty (60) if the URL points to a valid link lacking the full license text, and a license distance of eighty (80) if the URL reference points to a dead or otherwise invalid link. Furthermore, if the URL reference is contained in a declaring file that covers more than one source file or component, the license distance may be incremented for each additional source file or other component that shares the URL reference.

If a source file or other component contains Uniform Resource Locator (URL) with a substantially similar prefix as a known license URL, the license distance may be based on a level of authority for the known license URL. If URL reference only shares a substantially similar prefix to a known license URL, the reference may be considerably less reliable than a complete reference to the URL and may therefore receive a higher license distance than a complete URL. For example, in one implementation, URL references that only share a prefix with a known license URL may be assigned a license distance with a minimum of ten-thousand (10,000+), which may increase with increasing uncertainty.

If a source file or other component contains source code that is substantially similar to another source file or component in a different package, a distance between the substantially similar source files or components may be determined. In one implementation, the license distance between the substantially similar code may fall within a predetermined range based on the degree of similarity. For example, the distance between the substantially similar code may fall within a range having an inclusive minimum of one-thousand and an exclusive maximum of two-thousand (i.e., 1000 . . . 1999).

If a source file or other component has a pathname that is substantially similar or otherwise resembles a well known code namespace that has a known license, the source file may be implicitly associated with the license. If the shared pathname is the only reference to the license associated with the code namespace, the license declaration may be considered relatively unreliable, and may therefore have a relatively high value based on the similarity between the pathname and known code namespace. In one implementation, the distance between the source file or other component and the license associated with the code namespace may be a minimum of two-thousand (2000+), which may be incremented with increasing uncertainty. For example, a particular source file may have a pathname such as "./com/intellij/uiDesigner/core/DimensionInfo.class", which may resemble a code namespace for IntelliJ IDEA (www.jetbrains.com/idea/buy/buy.html), which is known to be associated with the Intellij IDEA License Agreement for Open Source Projects.

If the source file or other component includes a code transformation (e.g., an object file, a library component, etc.), the code transformation may receive a license distance based on the nature of the transformation. For example, object files or library components may be considered closely related to one or more source files, while binaries may be considered closely related to one or more object files or static library components and less closely related to shared libraries. Thus, in one implementation, object files and library components may have a license distance of ten (10) to all of the source files associated therewith and binaries may also have a license distance of ten (10) to all of the object files and static library components associated therewith. Further, to reflect the increased uncertainty for shared libraries, binaries may have a license distance of one-hundred (100) to the shared libraries.

Although the foregoing description of exemplary rules and license distances reflect relative importance and reliability of various factors relating to license declarations and component relationships, the reliability of these and other factors may be considered somewhat subjective and amenable to modification. Thus, in one implementation, compliance officers or other authorized reviewers may add new rules, modify or remove existing rules, or otherwise tailor the methodology for determining license distance based on learned experience or other factors. As such, whether any one license distance rule is necessarily more reliable than another should not be considered absolute, and the foregoing rules and license distances should therefore be regarded as exemplary only.

Figure 2:
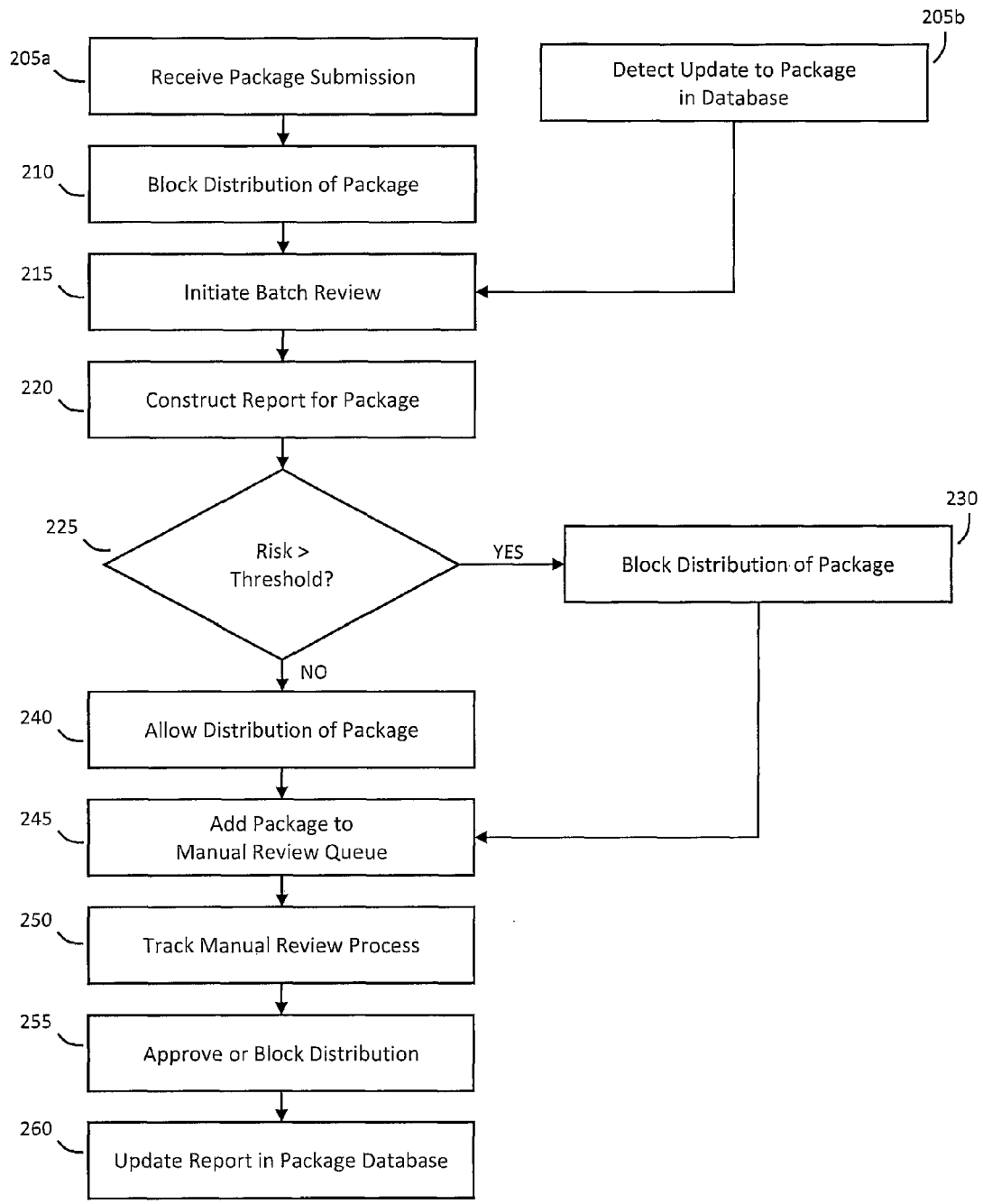
FIG. 2 illustrates an exemplary process for performing software due diligence review, according to one aspect of the invention.

According to one aspect of the invention, FIG. 2 illustrates an exemplary process for performing software due diligence review. In particular, the automated software due diligence review process may include, among other things, receiving a package submission for batch review in an operation 205a. For example, in one implementation, a software due diligence system may monitor a build system to determine when a user initiates a request to review a package in the build system and/or submits a new package to the build system. If the submission received in operation 205a relates to a package that has not been previously reviewed, the package may be initially associated with a status of "candidate", wherein an operation 210 may include placing an initial block on distribution of the candidate package pending the batch review of the package. Alternatively (or additionally), when an update to a package that has already been reviewed is detected in an operation 205b, a batch review may be initiated for the updated package. The batch review for the package submission and/or updated package submission may then be initiated in an operation 215.

In one implementation, the batch mode review performed in operation 215 may include identifying one or more source files associated with the package under review, wherein the identified source files may be placed into a job queue. The batch mode review performed in operation 215 may then include processing the files in the job queue to identify one or more keywords that match one or more text patterns relevant to software due diligence (e.g., keywords relevant to software licenses, patent and copyright usage, export regulations, etc.). In one implementation, information relevant to reviewing the package for licensing or other compliance issues may be retrieved and downloaded to a local review database (e.g., license information, package information, report information, etc.). The local review database may support locking or otherwise synchronizing information with the build system, whereby using locally stored information may reduce communication or other processing latencies. Subsequently, in an operation 220, one or more reports may be constructed for the package based on the batch review performed in operation 215.

In one implementation, the reports constructed in operation 220 may include a risk level that provides a metric for any software due diligence issues that may have been identified in operation 215. If the risk level for a reviewed package does not exceed a predetermined product-specific threshold, the package may receive a status of "production" in an operation 240, thereby allowing the package to be distributed. If the risk level exceeds the threshold, however, distribution of the package may be blocked in an operation 230. For example, if the reviewed package is a new submission that was received in operation 205a, the block placed on distribution of the package in operation 210 may remain in force, whereby the new package submission may remain a "candidate" pending subsequent manual review. Furthermore, if the reviewed package includes an updated submission received in operation 205b, a prior review of the package may have resulted in the package receiving production status if the risk level remained below the threshold. In such cases, if the batch review performed in operation 215 results in the risk level exceeding the threshold, the status of the updated package may be returned to candidate in operation 230 to block further distribution for the updated package In one implementation, after the batch review of the package has been completed (resulting in distribution of the package either being blocked or allowed), an operation 245 may include adding the package to a manual review queue. As such, a compliance officer or other authorized reviewer may manually review the package to remediate issues identified in the batch review, override blocks or permissions on distribution of the package, or otherwise finalize the due diligence review for the package. Furthermore, in one implementation, any keywords identified in the package during the batch mode review that remain unresolved may be flagged for the compliance officer or other authorized reviewer to remediate.

In one implementation, the manual review process may be tracked in an operation 250, wherein the tracked information may be used to update the report for a particular package (i.e., in an operation 260) or to otherwise update information used in the software due diligence system (e.g., to make the information available in subsequent batch mode runs). For example, in one implementation, a workflow engine may be used to manage the manual review process, wherein the workflow engine may be configured to track one or more workflows and/or sub-workflows for the manual due diligence review process (e.g., a SWAMP workflow that may include various different people working on different process steps). The workflows and/or sub-workflows may then guide different users through the remediation process, send notifications where required, assemble overview pages over running processes, schedule time-critical workflow paths, or provide other features useful in managing the review process for software under review, wherein operation 250 may including tracking the various processes involved in the manual review. After the compliance officer or other authorized reviewer has completed the manual review process, the compliance officer or other authorized reviewer may then approve or block distribution of the package in an operation 255. Subsequently, operation 260 may include updating the report for the package based on the results of the review.

Figure 3:
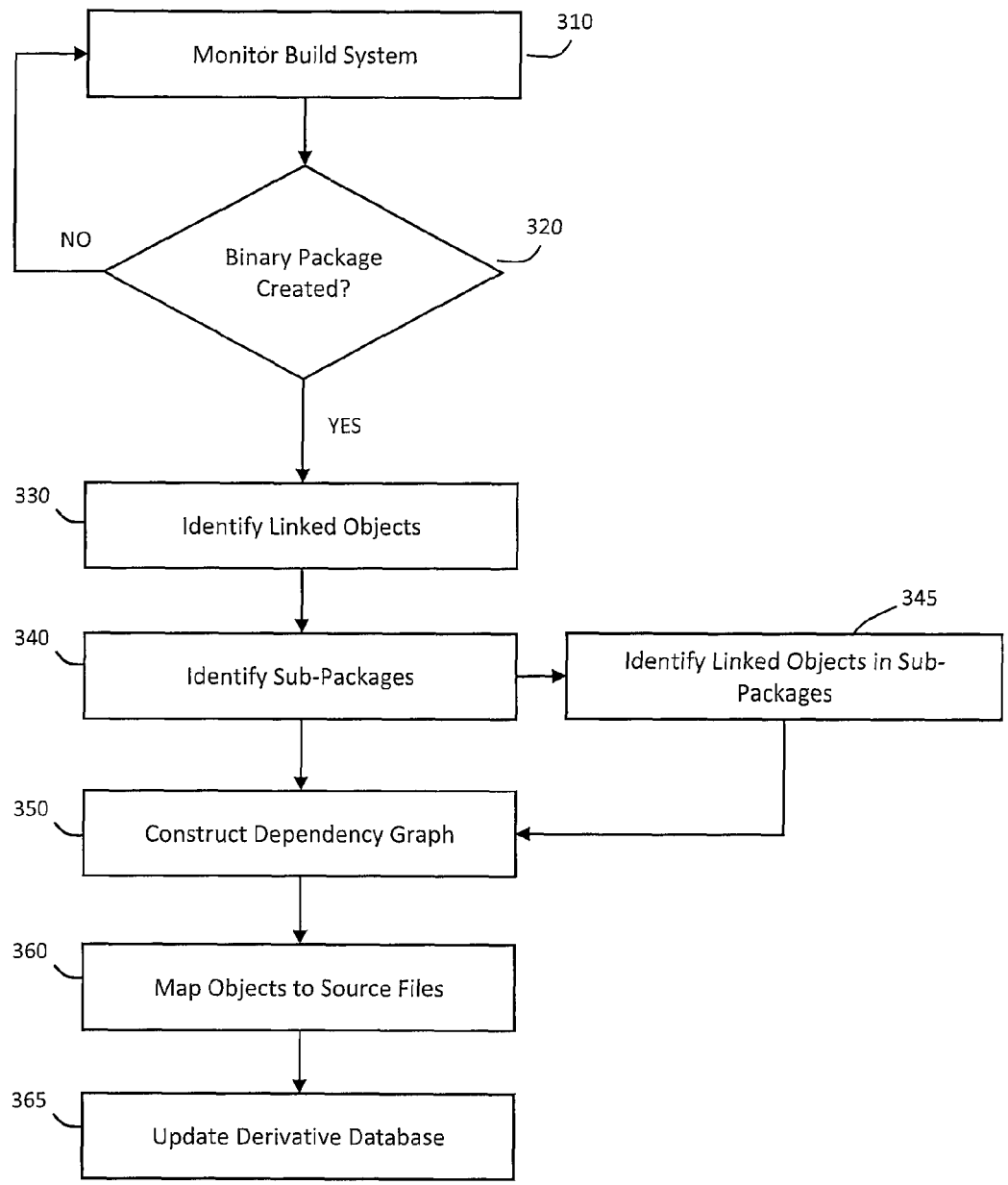
FIG. 3 illustrates an exemplary process for scanning binary objects in a software due diligence system, according to one aspect of the invention.

According to one aspect of the invention, FIG. 3 illustrates an exemplary process for using a binary scan engine to scan binary objects in a software due diligence system. In particular, the binary object scanning process may include, among other things, monitoring a build system in an operation 310 to detect when one or more binary packages or updated binary packages are submitted to the build system or another software pool. In particular, creation of a new binary package or updated binary package may be detected in an operation 320, and scanning of the binary package or updated binary package may then be initiated.

In one implementation, binary packages may be processed upon being submitted or otherwise created in the build system, wherein data used to build the binary packages may be automatically harvested from a build-root environment associated with the build system. For example, the data harvested from the build-root environment may include package relations, package dependencies, and various other linked objects. The harvested data from the build-root environment may be used to draw accurate dependency graphs and expose legal implications on a per-product basis. In other words, the build-root environment may expose all possible dependencies that a build target may use, wherein anything outside of the build-root may be guaranteed to not be a dependency. As such, the properties of the build-root environment may be exploited to avoid false negatives while possibly identifying false positives (i.e., false positives may present less of a compliance concern than false negatives because the former can be manually remediated, while the latter may result in erroneous compliance determinations).

In one implementation, as indicated above, processing the harvested data from the build-root environment to draw accurate dependency graphs may include identifying one or more linked objects associated with a particular binary package. For example, in one implementation, an operation 330 may include scanning a particular binary package to identify potential linked objects based on suffix (e.g., objects having certain suffixes may be identified as potential linked objects with respect to the binary package). The potential linked objects may be further scanned to identify exported linker symbols that indicate whether the objects are linked to a particular binary. In addition, information contained in one or more debug files may be analyzed to map object filenames to respective source code filenames.

Additionally, in one implementation, preliminary dependencies may be determined based on spec files, RPM headers, or other documentation for the binary package, and such preliminary dependencies may be analyzed in view of the information in the build system. Alternatively, the .spec files, RPM headers, or other documentation may be disregarded when determining dependencies because such dependency information may sometimes be over-inclusive and/or ambiguous. In other words, an RPM based system generally requires comprehensive dependency information to be installed in order for a build to succeed, whereas the build-root environment tends to have incomplete dependency information. These properties may be exploited in order to avoid impermissible false negatives, which are critical to the overall result of the due diligence review process and reserved to human reviewers. Thus, the build-root environment may be designated the appropriate authority for processing .spec files or other documentation because the build-root environment provides more reliable information for identifying all possible dependencies, wherein potential uncertainties may be handled by always erring on the side on false positives. Similarly, if .spec files, RPM headers, or other sources of documentation are used to identify preliminary dependencies, the build-root environment may provide information that can be used to disambiguate or otherwise refine the preliminary dependency information.

In one implementation, the linked object information identified in operation 330 may therefore include, among other things, potential linked objects (identified based on suffix information), exported linker symbols, mapped source code files (identified based on debug information), and disambiguated and completed dependencies (identified from documentation files). The linked object information may then be associated with the binary package and used in a subsequent operation 350 for constructing a dependency graph for the binary package. Additionally, an operation 340 may include analyzing the package to identify any sub-packages that may include further dependencies. For example, operation 340 may include collecting package relations for the binary package under review, wherein collecting the package relations may include identifying any sub-package names that originate from the same source code (i.e., the base package).

Thus, in one implementation, if one or more sub-packages are identified for a binary package under review, further linked objects may be identified for the sub-packages in an operation 345. Identifying linked objects for the sub-packages in operation 345 may function in a manner generally similar as described above with respect to operation 330, which may be useful in identifying the relevant source code for any given sub-package (i.e., via the base package). Furthermore, any build target objects found in the base package or sub-packages may be scanned for both linked objects and linking objects (i.e., using exported linker symbols that identify objects to which the sub-packages are linked, imported linker symbols that identify objects that link to the sub-packages, etc.). The various relationships among binary packages and their dependent objects may then be used to construct the dependency graph in an operation 350. As such, the dependency graph may provide a building block having sufficient information to establish a dependency graph between various segments of related source code, whereby an operation 360 may include mapping the various information in the dependency graph to relevant source files for subsequent due diligence review. Subsequently, an operation 365 may include updating the derivative database, wherein any dependency information or other information identified for the scanned binary may be stored in the derivative database.

Figure 4:
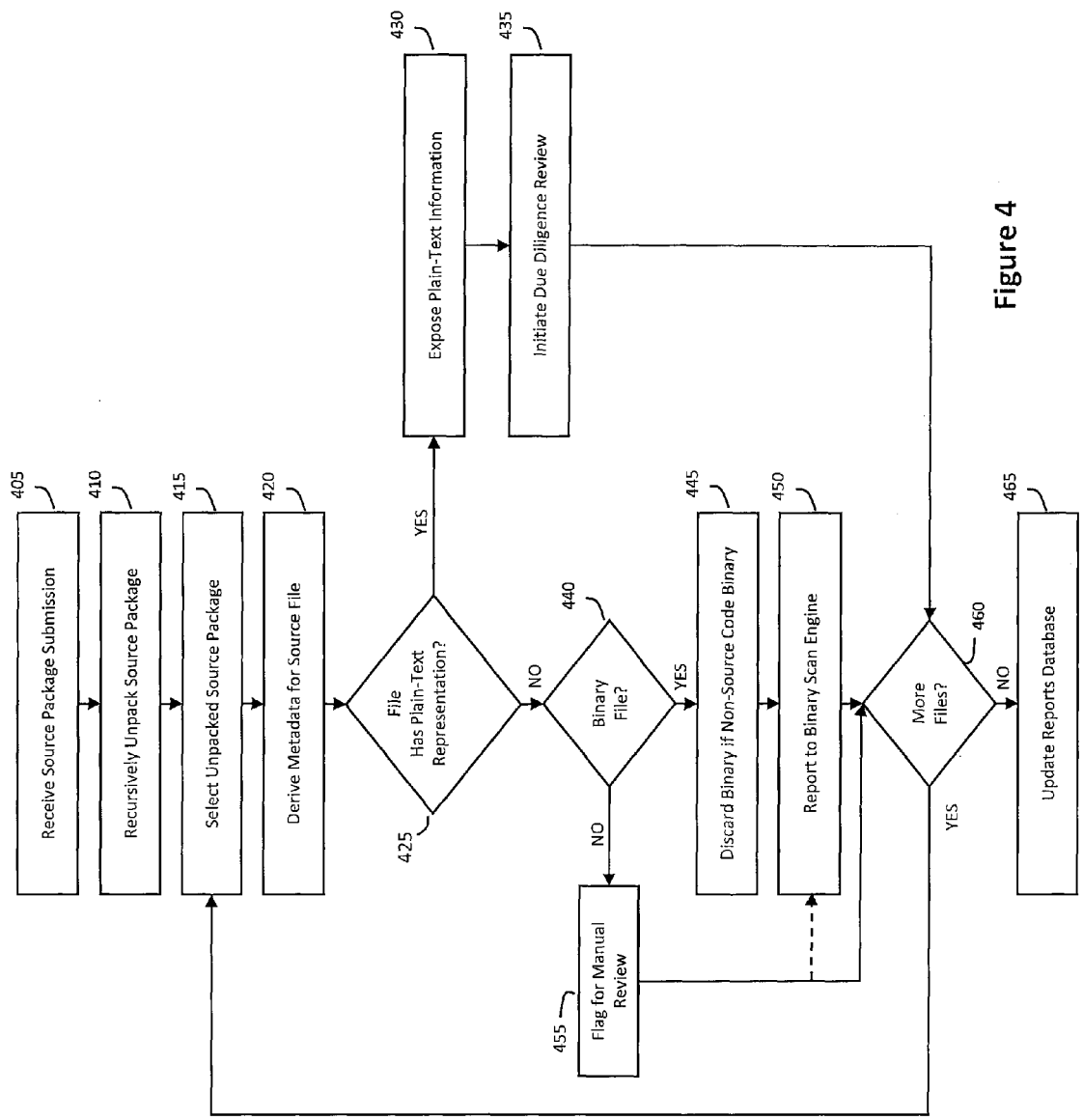
FIG. 4 illustrates an exemplary process for recursively unpacking packages in a software due diligence system, according to one aspect of the invention.

According to one aspect of the invention, FIG. 4 illustrates an exemplary process for recursively unpacking a source package to expose source code in a plain text format for review in a software due diligence system. In particular, the recursive unpacking process may include, among other things, receiving a source package submission in an operation 405. For example, the unpacking process may be used to handle source code packages (e.g., RPM packages), compressed or archived files (e.g., TAR, ZIP, JAR, or other archive files), partially unpacked inputs (e.g., a directory that contains a .spec file, patches, TAR archives, etc.), or any other suitable input that may be associated with one or more source files. Furthermore, a particular source code package, archive, or other collection of source files may include software at various different levels (e.g., in a hierarchical directory or tree), and the unpacking process shown in FIG. 4 may be used to recursively unpack the software in an operation 410 until the software has been unpacked at all of the different levels.

In one implementation, the recursive unpacking operation 410 may identify one or more unpacked source files. For example, the recursive unpacking operation 410 may recursively unpack source code packages, archives, or other software collections into one or more source files, which may generally include code-based binary files, non-code binary files, source code files, or various other types of files. As such, an operation 415 may include iteratively selecting one of the unpacked source (or non-binary) files for further processing, and a subsequent operation 420 may include deriving metadata for the selected source (or non-binary) file, wherein the derived metadata may be stored in the derivatives database, the reports database, or another suitable repository. For example, the metadata may be derived from a .spec file for a package, wherein the .spec file may identify information for configuring the package, patches to apply to the package, files to install for the package and locations where the files are to be installed, and system-level activity that occurs before and/or after installing the package, among other things. In another example, the metadata may be derived from sources such as a top-level directory or archive name, a suffix or magic header for the selected source file, a user input, or another suitable source, as will be apparent. The derived metadata may describe the unpacked source files (e.g., providing package names, version numbers, release numbers, etc.), providing information that can be used to determine an appropriate technique for exposing plain text information in the underlying unpacked files.

As such, in one implementation, an operation 425 may include determining whether the selected file has a plain text representation. If the selected file has a plain text representation, plain text information from the selected file may be exposed in an operation 430. For example, unpacked files having a well known textual representation may include plain text source code files, Portable Document Format (.pdf) files, PostScript (.ps) files, HyperText Markup Language (.html or .htm) files, etc.), or other such files. Plain text can thus be extracted, parsed, or otherwise exposed from the source code files, the PDF files, the HTML code, or other files with plain text representations. In an operation 435, once plain text information for the selected file has been exposed, software compliance review may be initiated for the selected file.

If the selected file does not have a plain text representation, an operation 440 may include determining whether the selected file is a binary file. If the selected file is not a binary file or otherwise cannot be processed further, the file may be flagged for manual review in an operation 455. However, if the file has a type that is known be irrelevant to software due diligence, the file may alternatively be discarded from further review. Alternatively (or additionally), operation 455 may optionally branch to an operation 450, wherein the file may be reported to a binary scan engine for further processing (i.e., to attempt to extract further information relating to the binary).

If the selected file is determined to be a binary file, the unpacking process may then include identifying whether the binary file is a code-based or non-code binary. The non-code binaries (e.g., image files, raw data, etc.) may be characterized as not including or otherwise referencing source code, such that an operation 445 may skip or otherwise discard the non-code binary from further review. If the file is a code-based binary (typically a .dll or .exe file), the file may be identified as likely being a derivative of source code or otherwise referencing source code. As such, operation 450 may include reporting the code-based binary to the binary scan engine (e.g., as described above) for further analysis or querying a derivative database for further information relating to the code-based binary. However, it will be apparent that if the binary scan engine has previously analyzed the code-based binary, the unpacking process 410 may include analyzing component dependency trees, linked objects, debug files, or other dependency information for the binary to identify relevant source files and extract plain text information, as appropriate. Alternatively, such information may be obtained via the derivatives database (e.g., as collected from the build-root or the debug information analysis before, during, and/or after the unpacking).

In one implementation, whether any further unpacked files remain to be reviewed after processing the selected file may be determined in an operation 460. If no more unpacked files remain to be processed, then the unpacking process may be completed in an operation 465, wherein the reports database may be updated in view of the information obtained in the unpacking process. On the other hand, if more unpacked files are determined to exist, then processing may return to operation 415, where another unpacked file is selected and processed as described above. When the unpacking process completes, operation 435 may include providing the plain text information and derivative information retrieved by the binary scan engine to a software diligence engine, which may then perform due diligence review for the unpacked files.

Figure 5:
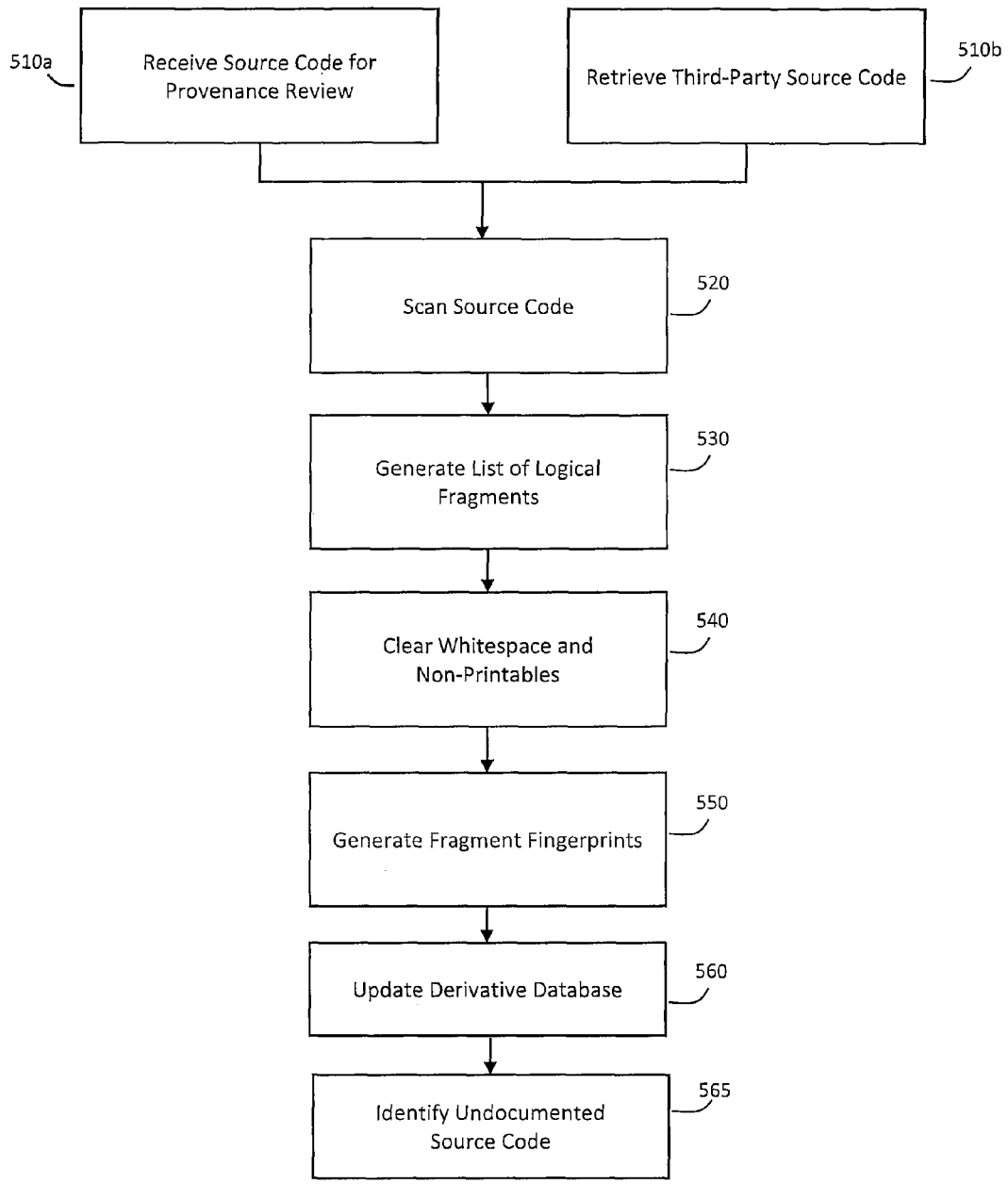
FIG. 5 illustrates an exemplary process for performing code provenance review in a software due diligence system, according to one aspect of the invention.

According to one aspect of the invention, FIG. 5 illustrates an exemplary process for performing code provenance review in a software due diligence system. In particular, the code provenance review process may include, among other things, receiving source code under review in an operation 510*a*. Additionally, in an operation 510*b*, third-party source code may be retrieved at any suitable time before, during, and/or after the source code under review is received. In one implementation, the third-party source code may be retrieved from one or more third-party repositories, including various known open source repositories (e.g., SourceForge, Google Code, OpenSUSE, Fedora, Debian, etc.).

Thus, because license information, cryptography usage, and other information related to software due diligence issues may be known for the third-party source code, the code provenance review process may determine whether the source code under review lacks proper documentation. In particular, if at least a portion of source code under review matches at least a portion of third-party source code, then the source code under review may be determined to share some or all of the known software due diligence information for the third-party source code. As such, the manner for analyzing source code described in further detail below may apply to either or both of the source code under review and the third-party source code. The code provenance review process may then draw comparisons between the source code under review and the third-party source code to identify potential compliance issues. In addition to determining whether software identified as closed source (or proprietary) lacks proper documentation for open source components, the code provenance review process may cross-reference software with declared open source against well-documented open source to derive reliability information for open source software under review. For example, open source software under review may be cross-referenced with well-documented open source to enumerate redundancies, which may raise confidence in the information declared in the software under review. Other exemplary techniques for deriving reliability information may include, among other things, identifying contradictions to expose potentially false license declarations, implicitly creating choice licenses by exploring possibilities for alternate terms and conditions, and locating large overlaps to find outdated or divergent versions of the same source code.

Thus, after receiving information relating to the known open source and the source files under review in operation 510*a* and 510*b*, an operation 520 may include scanning the source code under review and/or the third-party source code using a language-independent text fracturing algorithm. For example, in one implementation, the text fracturing algorithm used in operation 520 may be based on the Perl module Text::Fracture, which implements a text sub-division technique, as illustrated in the following exemplary Perl source code:

```
use Text::Fracture qw(init fract)
init({ max_lines => 20, max_cpl =>200, max_chars => 1000 });
my $text = { open my $fh, "/etc/termcap"; local $/; <$fh> };
my $aref = fract($text);
# [
#   [ $offset = 0, $length, $lines_offset = 1, $line_count ],
#   [ $off2 = $length, $len2, $l_off2 = $line_count, $l_cnt2 ],
#   [ $off3 = $off2+$len2, $len3, $l_off3 = $l_off3 + $l_cnt2 − 1,
$l_cnt3 ],
# ...
# ]
```

Thus, in one implementation, scanning the source code in operation 520 may generally include receiving an input text (e.g., via the fract( ) function shown in the exemplary source code provided above). The input text may then be scanned in view of one or more rules, wherein the rules may be applied to source code text, plain text, XML text, HTML text, postscript text, or any other textual file format, as will be apparent. In one implementation, the source code scanning operation 520 may include initializing the text fracturing algorithm to establish various parameters for sub-dividing the input text.

For example, in one implementation, the text fracturing algorithm may be initialized to establish parameters for a maximum number of lines per fragment (max_lines), a maximum number of characters per line (max_cpl), and a maximum number of characters per fragment (max_chars), among other things. Furthermore, the text fracturing algorithm may be reinitialized at any suitable point in time to change one or more of the parameters.

Once the text fracturing algorithm and the input source code text has been suitably scanned, an operation 530 may include fracturing or otherwise sub-dividing the input text to generate a list of logical fragments from the input text. In one implementation, the text fracturing algorithm may be considered distinct from a parser, in that minimal semantics are used to determine where a logical fragment should end. Rather, the text fracturing algorithm may apply a set of rules that determines a placement for borders of the fragments based on blank lines, white space, or other language-independent features of the input text (e.g., a logical fragment border may be placed at an occurrence of a blank line sequence, such as "\n\n").

As such, in one implementation, the set of rules for determining where logical fragments should begin and/or end may be based on heuristic methods developed through experimentation, trial, and error, wherein the heuristics may not necessarily agree with human perception or a factual structure of the text (i.e., the logical fragments may not be "logical" in the sense of source code design or implementation). The heuristic rules may thus be developed to fragment input text in a manner that accounts for variations in coding style, and to create logical fragments that include paragraphs, snippets, or other logical blocks that are as large as possible without being independently copyrightable (i.e., the logical fragments should represent discrete portions of code that are unlikely to be modified). Thus, the logical fragments may be considered unlikely to change when copied from one source code file to another, thus identifying potential undocumented source code usage (including open source and/or closed source, as appropriate). For example, in one implementation, the input text may be fractured or otherwise sub-divided into the logical fragments using one or more of the following rules, although it will be apparent that the rules may be augmented or otherwise modified based on various heuristic factors.

In one implementation, the rules may specify that a number of lines in any particular logical fragment cannot exceed the parameter established for the maximum number of lines per fragment. In other words, the number of newline characters (e.g., "\n") in a particular fragment must be equal to or less than the parameter for the maximum number of lines per fragment. In one implementation, the set of rules may further count carriage return characters (e.g., "\r") and carriage return newline character combinations (e.g., "\r\n", "\n\r", etc.) as a newline character. As such, blank lines may be recognized in the input text in a manner independent of file type.

In one implementation, the rules may be further designed to gracefully handle an absence of newline characters in the input text. For example, if a particular line of the input text has a number of characters that exceeds the parameter for the maximum number of characters per line, the line may be analyzed to identify a last non-alphanumeric character preceding a character located in a position that would equal the maximum number of characters per line. The identified non-alphanumeric character may then be treated as a newline character to handle the lack of newline characters. Alternatively (or additionally), one implementation of the rules may provide for a minimum number of lines per fragment in addition to the maximum number of lines per fragment. If a particular fragment has the maximum number of lines, a shortest logical line appearing in a position between the minimum number of lines and the maximum number of lines may be treated as though followed by a blank line.

In one implementation, the rules may be further designed to handle certain types of characters associated with the American Standard Code for Information Interchange (ASCII). For example, ASCII art rulers are often used within source code to visually indicate column-width or other measuring criteria. Thus, one implementation, to account for the potential presence of an ASCII art ruler, the rules may allow a sequence of characters ending a particular line to be repeated without increasing a logical length of the line. In particular, the logical length of the line is not increased in order to increase a likelihood of any ASCII art rulers becoming an ending border of a logical fragment (i.e., because subsequent lines of the input text may be more likely to contain source code fragments that are less likely to be modified, whereas the ASCII art ruler can easily be removed from the text without affecting functionality of the source code).

In one implementation, the rules may be further designed to identify and include all closing braces or other brackets of a nested code block, up to but not including a subsequent keyword, in one logical fragment. For example, in one implementation, a read-ahead may be performed to identify a last number of characters in a logical fragment. If one or more lines are identified that only contain characters in the read-ahead portion of the fragment, the identified lines may be considered part of that logical fragment. For example, if the only character or characters contained in a particular line are closing brackets (e.g., "}", ")"), the line may be considered part of a logical fragment that includes one or more preceding lines. In this manner, all closing braces or other brackets of a nested code block may be included in one logical fragment, up to but not including one or more subsequent keywords.

In one implementation, the rules may be further designed to identify where a particular indentation ends, as the end of the indentation may indicate that subsequent lines of text should be treated as a new logical fragment. For example, in one implementation, if a first line of text begins with whitespace and a subsequent line does not begin with whitespace, the first line beginning with the whitespace may be determined to be an ending border of a logical fragment, while the subsequent line that does not begin with whitespace may be considered a candidate for a new logical fragment.

In one implementation, the rules may be further designed to separate keywords, variable names, or similar text strings from comment characters and block-building structures. For example, in one implementation, any whitespace at the beginning of a line may be skipped, and a determination may be made as to whether a first non-whitespace character in the line is an alphanumeric or non-alphanumeric character. If the line begins with a non-alphanumeric character and a subsequent line begins with an alphanumeric character (or vice versa), the line may be selected to be an ending border of a logical fragment. In other words, if two adjacent lines respectively have one alphanumeric character and one non-alphanumeric character as the first non-whitespace character, the input text may be sub-divided to have the adjacent lines in different logical fragments. In this context, characters that are not literally alphanumeric may be nonetheless be considered alphanumeric if the characters typically accompany keywords or variable names in source code (e.g., "$", "_"). Further, the non-alphanumeric characters may include any suitable characters that typically reflect comment sections (e.g., "%", "#", "/", "*") and/or building block structures (e.g., "(", ")", "{", "}", "[", "]").

In one implementation, the list of logical fragments generated in operation 530 may be recorded in a manner suitable for subsequent analysis (e.g., in a fingerprint database). For example, the list of logical fragments may be recorded as a two-dimensional array. In particular, the two-dimensional array may generally include an array of the logical fragments, wherein each logical fragment in the array further includes an array of numeric elements describing the logical fragment. For example, the numeric elements may include, among other things, a byte offset identifying a first byte of the fragment, a line offset identifying a first line of the fragment, a length of the fragment (including trailing newline characters) expressed as a number of bytes, and a number of lines in the fragment. In one implementation, the number of lines in a particular fragment typically equals the number of newline characters in the fragment. However, for the last fragment in the input text, the number of lines in the fragment may be one more than the number of newline characters if no trailing newline character exists (e.g., the fragments "foo\nbar\n" and "foo\nbar" may both be reported as being two lines long).

In one implementation, after the list of logical fragments has been generated in operation 530, the individual fragments may be further analyzed to identify potentially undocumented source code. In particular, each fragment may be analyzed using a fingerprint algorithm that features arithmetic for generating a hash value from a text string corresponding to each particular fragment. For example, in one implementation, the fingerprint algorithm may be based on the Perl module Digest::FP56x1xor, which may be used to generate a 64-bit fingerprint from the text string corresponding to a given logical fragment, as illustrated by the following exemplary Perl source code:

```
use Digest::FP56x1xor qw(gen cat); # ... x2l l2x gen_x cat_x
my $hash1 = gen_l($text1);
my $hash = cat_l($hash1, $hash2);
my $hash1_x   = gen($text1);
my $hash_x    = cat($hash1_x, l2x($hash));
my $hash      = x2l($hash_x);
my $h         = sub(gen($text1.$text2), gen($text2));
cooked($buffer, $offset, $length);
my $cooked = cooked("\f\n \t Hello World.\n\n\n+ Bye
( 3+ 4) = FOO ... \n");
# $cooked = "Hello World. Bye(3+4)=FOO..."
```

In one implementation, generating the fingerprint for a particular logical fragment may include an initialization operation 540 (e.g., corresponding to the cooked( ) function in the exemplary source code provided above). In particular, operation 540 may include clearing whitespace and non-printable characters from a string that corresponds to the logical fragment. In one implementation, offset and length parameters may optionally be provided to the initialization operation 540 to limit a portion of the input text to be cleared of whitespace and non-printable characters. If no optional offset or length parameters are provided, the offset parameter may receive a default value of zero (0) and the length parameter may receive a default value to the entire string (or the entire string remaining after the offset if the optional offset parameter is provided).

In one implementation, clearing the whitespace and non-printable characters in operation 540 may treat all characters exceeding ASCII character codes one-hundred twenty-seven (127) as non-printable, wherein one tilde character ("~") may be used to replace any such character codes. Furthermore, any leading plus character ("+"), minus character ("−"), less than character ("<"), or greater than character (">") at the beginning of a line of text may be removed (i.e., to standardize the output for either a unified or normal diff comparison to the original text). Additionally, newline characters, carriage return characters, or other similar characters may be treated as whitespace (e.g., "\r", "\n", "\v", "\f"), and any leading or trailing whitespace may be removed from the string. For internal (non-leading) whitespace, the internal whitespace may be reduced to one space character (" ") if any word characters delimit either side of the internal whitespace, whereas the internal whitespace may be removed if no word characters delimit either side of the internal whitespace.

After the whitespace and non-printable characters have been cleared from the text string corresponding to a logical fragment, an operation 550 may include generating a hash fingerprint value for the cleared fragment. In one implementation, the hash fingerprint value may be generated using a fingerprint algorithm that primarily employs a generate method and a concatenate method. The generate method may receive an input string as an argument and generate a hash value from the input string, while the concatenate method may compute a hash value that corresponds to the concatenation of two or more text strings from which the arguments of the concatenate method were generated.

In one implementation, the generate method may return a 64-bit integer, with the highest eight bits being used in the concatenate method. In one implementation, the highest eight bits may be computed using a modulo (or "mod") operator that finds a remainder of dividing fifty-six into a length of the input string (e.g., if the input string has a length of sixty-two, the mod operator would yield a remainder value of six, represented as 00000110 in binary). As such, the highest two bits in the hash value will always remain zero (i.e., the highest two bits would represent binary values of one-hundred twenty-eight and sixty-four, respectively, yet the mod function would not yield a remainder larger than fifty-five).

In one implementation, the generate method may further return an actual hash value for the lower fifty-six bits of the input string fingerprint. In one implementation, the hash value may be computed using a static set of random numbers taken from atmospheric noise. In particular, atmospheric noise may provide a high quality random number source, and may thus be used to obtain a hash value from a random number table populated on the basis of the atmospheric noise. As a result, the hash value may be computed faster than would be required for a complex hashing algorithm in addition to maintaining high quality at fifty-six bits.

In one implementation, referring to the above-provided Perl implementation, the methods l2x( ) and x2l( ) may be used to convert between a hexadecimal and integer representation of a fingerprint. As such, the following equation may always be considered true: cat(gen($text1), gen($text2))==gen($text1.$text2). In other words, if two sub-strings ($text1 and $text2) cover the entire input text string ($text) without overlapping one another, the hash for the input text string ($text) can be calculated from the concatenation of the two sub-strings ($text1.$text2). Further, the expressions gen($text), l2x(gen_l($text)), and sprintf("0x016x", gen_l($text) may always be equivalent, while the expressions gen_l($text) and x2l(gen($text)) may always be equivalent.

Thus, the foregoing fingerprint algorithm may be used to generate a unique 64-bit fingerprint for each of the logical fragments identified in the source code under review and the third-party source code. The fingerprints may then be recorded in a database or another suitable repository in an operation 560, and a subsequent operation 565 may include identifying potentially undocumented source code if the fingerprint generated for any of the source code under review matches the fingerprint generated any of the third-party source code. Any such matches may be flagged as potentially presenting a code provenance compliance issue that should be manually reviewed and remediated. To that end, the fingerprinting module provided above may further include a lookup operation that may be used to retrieve plain text from local or remote repositories for the fingerprint, whereby a compliance officer or other authorized user can view the plain text to determine whether source code under review lacks proper documentation. For example, referring to the exemplary Perl implementation given above, the lookup operation may be used to generate a value for $h, where $h==gen($text1).

Figure 6:
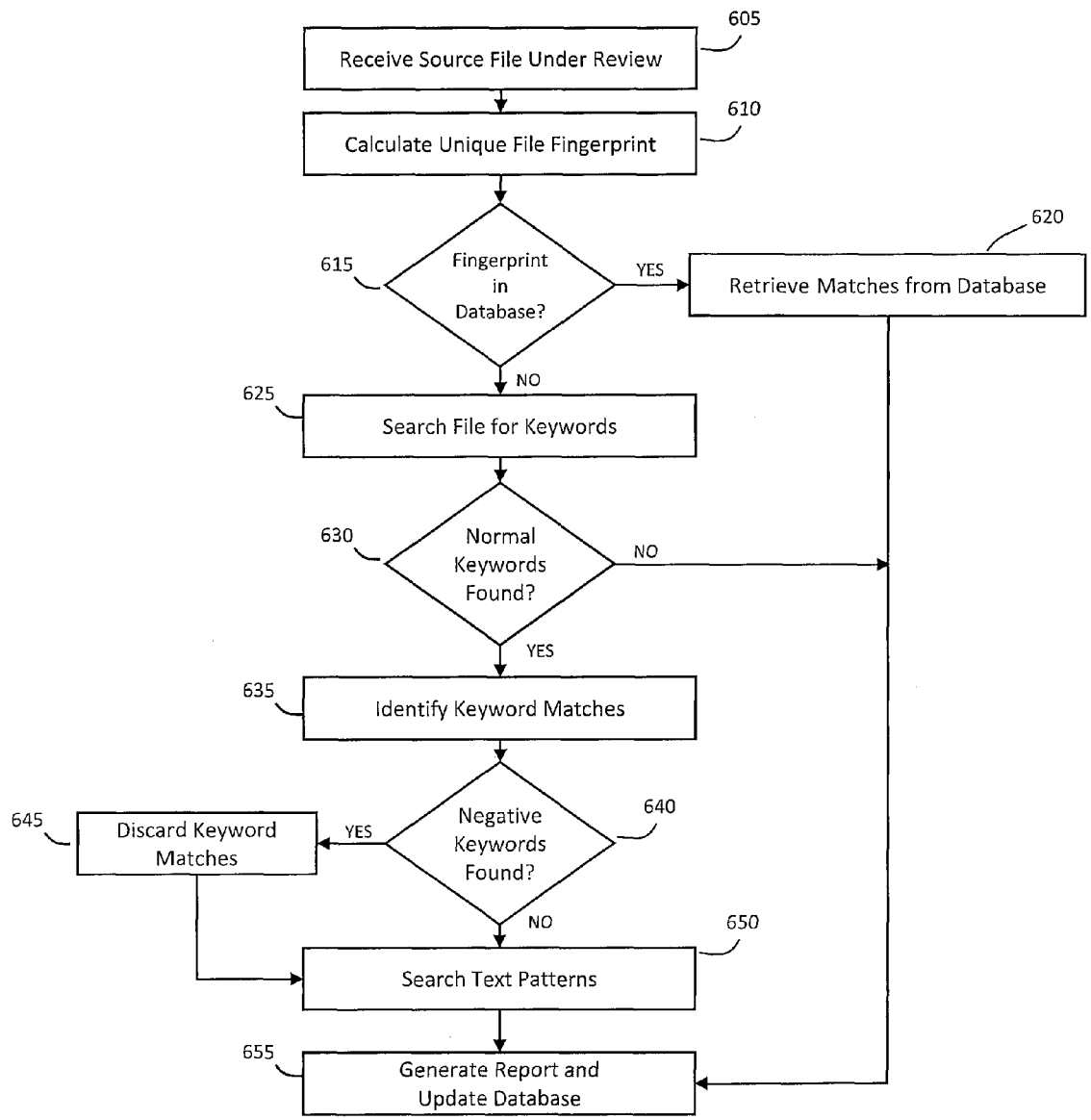
FIG. 6 illustrates an exemplary process for matching keywords in a software due diligence system, according to one aspect of the invention.

According to one aspect of the invention, FIG. 6 illustrates an exemplary process for matching keywords in a software due diligence system. In particular, a source file under review may be received in an operation 605, wherein the identification of certain keywords in the source file may indicate that the source file contains language relevant to software due diligence review. For example, keywords identified in the source file under review may be screened against a plurality of text patterns that contain excerpts of the language relevant to software due diligence review. Additionally (or alternatively), if certain keywords are identified in the source file under review but the keywords fail to match any of the text patterns, the identified keywords may be indicative of language that should be included in a new text pattern (e.g., using text surrounding the unmatched keyword). Thus, the keyword matching process illustrated in FIG. 6 may be useful to identify relevant language in a source file for further analysis in addition to providing clues or other indicators regarding novel text patterns that are potentially relevant to software due diligence.

In one implementation, the process for matching keywords in a source file may include an operation 610, in which a unique fingerprint may be generated for the received source file. For example, the unique fingerprint for the source file may include a 128-bit cryptographic hash value (e.g., MD5 checksum), a 64-bit integer generated from the plain text of the source vale (e.g., using the fingerprint algorithm discussed above in connection FIG. 5), or any other suitable mechanism for generating a unique file fingerprint, as will be apparent. The file fingerprint may uniquely identify the source file, and may therefore be used to determine whether the keyword matching process can be skipped for the source file.

For example, in one implementation, an operation 615 may determine whether the generated file fingerprint for the source file already exists in a database or other repository. If the file fingerprint exists, operation 615 may include determining that the source file has already been reviewed (e.g., during review for a prior version of the package or source file, during review of another package that includes or otherwise references the source file, etc.). In such a case, an operation 620 may include retrieving matching keywords and/or text patterns associated with the prior review of the source file and adding the matches to a result set for the current review of the source file. In one implementation, if no new keywords or text patterns have been added since the prior review, the keyword and text pattern matches from the prior review may be sufficient to generate a report for the current review in an operation 655, wherein the report may be stored in the reports database. However, if any new keywords and/or text patterns have been added since the prior review, the source file may be searched again (e.g., as described below in connection with operations 625-650). In particular, the source may be searched again to determine if any of the new keywords and/or text patterns are contained in the source file, in which case the report generated and stored in the reports database in operation 655 may further include the results of the updated search.

In one implementation, if the unique fingerprint for the source file is not in the database or new keywords and/or text patterns require the review of the source file to be otherwise updated, the source file may be searched for one or more keywords in an operation 625. In particular, operation 625 may include searching a plain text representation of the source file to identify one or more strings or sub-strings that match entries in a predefined list of keywords. For example, the list of keywords may generally contain terms, vocabulary, or other information considered likely to appear in legal language or another context relevant to due diligence review, while also being generally uncommon or otherwise unlikely to appear within source code outside of such a context (e.g., "license", "copyright", "distributed", etc.). In one implementation, the source file may be searched in operation 630 to identify one or more of matching normal keywords, negative keywords, weak normal keywords, and/or weak negative keywords within the source file.

As such, an operation 630 may include determining whether the source file contains any normal keywords and/or weak normal keywords. For example, normal keywords may generally indicate relevant legal language or other vocabulary associated with software due diligence issues (e.g., "license", "copyright", "distributed", "cryptography", "warranty", etc.). Weak normal keywords may be used in a similar manner as normal keywords, except that a weak normal keyword alone may be insufficient to trigger a keyword match (i.e., weak normal keywords, such as "used", "modified", "any purpose", may identify possible keyword matches). Thus, if no normal keywords or weak normal keywords are identified in a particular file, the file may be marked as not containing any keywords that are relevant to due diligence review. As such, subsequent stages of matching keywords and text patterns to the source file may be skipped, and a report may be generated for the source file and stored in the reports database in operation 655 (e.g., based on any keyword and/or text pattern matches from a prior review of the source file).

On the other hand, if one or more normal keywords and/or weak normal keywords are found in the source file, one or more keyword matches may be identified in an operation 635. For example, the keyword matches identified in operation 635 may include all the normal keywords found in the source file, and may or may not include one or more of the weak normal keywords. In particular, weak normal keywords may each be associated with a threshold value (e.g., a fraction between zero and one), wherein each weak normal keyword identified in the source file may increase a normal counter according to the associated threshold value. Thus, in operation 635, any weak normal keywords identified in the source file may only trigger a keyword match when the weak normal keywords are surrounded with further normal keywords and/or weak normal keywords to the extent of causing the normal counter to exceed a first threshold value associated with a keyword match (e.g., one or another value).

In one implementation, after identifying all of the keyword matches in the source file, a determination may be made in an operation 640 as to whether the source file includes any negative keywords and/or weak negative keywords. For example, negative keywords may generally be used to negate normal keyword matches, wherein a threshold proximity associated with each particular negative keyword may mask any normal keywords and/or weak normal appearing within the threshold proximity of the negative keyword. In, one implementation, the threshold proximity for negative keywords may include a number of lines, a number of words, or another value. Weak negative keywords may function in a similar manner, except that a weak negative keyword alone may not negate a match. Rather, weak negative keywords may also be associated with a threshold value, where each occurrence of a weak negative keyword decreases a negative counter according to the associated value. If various occurrences of weak negative keywords cause the negative counter to exceed a second threshold value, the values associated with the weak negative keywords may then be subtracted from the normal counter. Thus, weak negative keywords may only negate matches to the extent of causing the negative counter to exceed the second threshold value and further causing the normal counter to remain below the first threshold value.

Thus, if one or more negative keywords and/or weak negative keywords are identified in the source file, the identified negative and/or weak negative keywords may be used in an operation 645 to discard one or more of the keyword matches identified in operation 635. In particular, negative keywords and/or weak negative keywords may capture certain phrases that are known to include normal keywords despite the phrases being irrelevant to due diligence review. As such, operation 645 may analyze the negative keywords and/or weak negative keywords to identify and discard false positives for such phrases (e.g., the negative keywords "distributed algorithm" and "distributed comput" may negate false positives associated with the normal keyword "distributed", which is often found in references to GPL and/or LGPL).

If any keyword matches remain after the negative and/or weak negative keywords have been applied in operation 645, or if there were no negative and/or weak negative keywords in the source file, an operation 650 may include searching a plurality of text patterns against the keywords. For example, in one implementation, a license database may contain a very large number text patterns that each include an excerpt of legal language or another string of text considered relevant to software due diligence. Thus, as will be described in greater detail below with reference to FIG. 7, operation 650 may include searching the text patterns to match text contained in the source file to relevant software licenses (e.g., GPL, LGPL, etc.) or other entries in the license database (e.g., a cryptographic algorithm). Based on the results of the text pattern matching, a compliance report may be created and attached to any entries for the source file in the reports database in operation 655.

Figure 7:
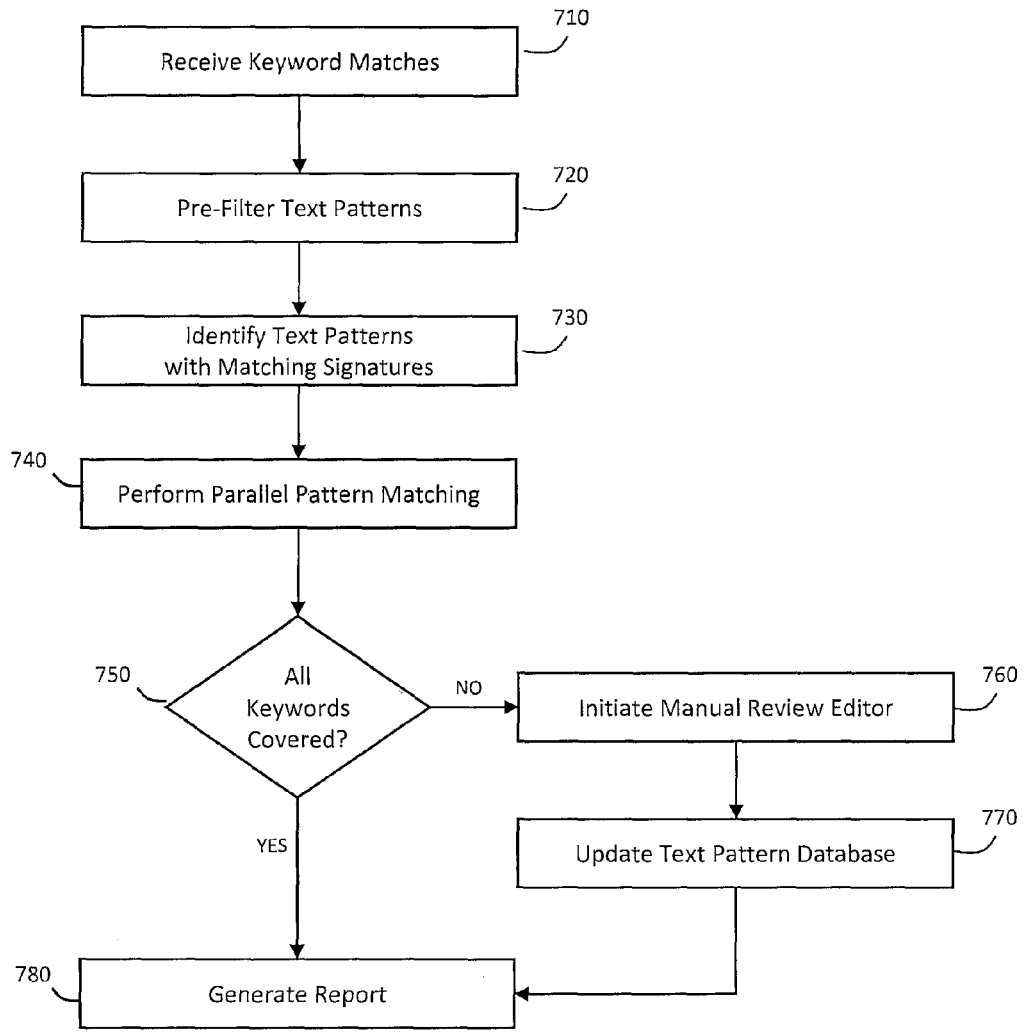
FIG. 7 illustrates an exemplary process for performing parallel pattern matching in a software due diligence system, according to one aspect of the invention.

According to one aspect of the invention, FIG. 7 illustrates an exemplary process for massive parallel text pattern matching in a software due diligence system. For example, in one implementation, the software due diligence system may employ a license database that contains a massive number of text patterns (e.g., on the order of one-hundred thousand to one million or more), wherein each of the text patterns include an excerpt of legal language considered relevant to software due diligence. In particular, the text patterns may generally include any suitable string or sub-string considered relevant to software due diligence, including text within a software license (e.g., GPL, LGPL, etc.), a cryptographic algorithm relevant to export controls, or other relevant text. Moreover, the text patterns may include negative text patterns to cover matching keywords that appear within a context known to be irrelevant to legal interpretation. Thus, any keywords contained in a source file under review may be received in an operation 710, and the text patterns may subsequently be searched to match each keyword to at least one text pattern.

Prior to actually searching the text patterns, an operation 720 may include pre-filtering the text patterns applicable to the keywords identified within a given source file. In particular, pre-filtering the text patterns may reduce a number of applicable text patterns to be searched, thereby enhancing the efficiency of searching a massive number of text patterns and also generating higher quality text pattern matches. For example, in one implementation, any text patterns that do not include at least one of the keywords received in operation 710 may be discarded for the source file currently under review. Any remaining text patterns would therefore include at least one of the keyword matches, whereby the remaining text patterns may be referred to as a global set of potentially relevant text patterns. In this manner, the massive parallel text pattern matching process may exclude any text patterns that cannot result in a match due to a lack of the relevant keywords, which may be significant when searching a very large number of text patterns.

In one implementation, the pre-filtering operation 720 may further include extracting a suitable subset of text patterns from the global set to form a local set of potentially relevant text patterns. For example, the local set of text patterns may include any text patterns that have already been matched to a different version of the source file, another source file in a package associated with the source file under review, a different version of the associated package, or another software component known to be relevant to the source file under review (e.g., a source file or library external to the package associated with the source file under review may be determined to be relevant based on a component dependency tree created under the control of a binary scan engine). The local set of text patterns extracted in operation 720 may therefore be searched prior to the global set of text patterns, as the local set of text patterns may be expected to have a high probability of resulting in a match based on their previously being matched to a related software component.

In one implementation, after the number of applicable text patterns have been pre-filtered into the global set of text patterns and the local set of text patterns, actual text pattern matching may be performed in one or more passes. For example, in one implementation, a first pattern matching pass may include an operation 730, wherein text patterns having a signature that matches a signature of the source file under review may be identified. In particular, a signature may be generated for each of the source file under review and the text patterns in the local set of applicable text patterns, wherein the signatures may generally include a short string generated from the relevant source file or text pattern.

In one implementation, generating the signatures may include converting a first letter of each word in the relevant source file or text pattern to lower case to ensure that the words in a particular signature string all start with lower case letters. Further, when generating the signatures for a given text patterns, the text pattern may be searched to identify a largest text block that does not include any wildcards (i.e., the identified text block may not include truncation or wildcard expressions, such as "$OWNER", "$VAR", etc.). The largest text block identified in the text pattern may then be analyzed to select a predetermined number of letters that begin the text block, wherein the selected letters may be concatenated to form the signature string. For example, in one implementation, the text pattern may be analyzed to select the first thirty-two letters at the beginning of the text block, although it will be apparent that another suitable number of letters may be used, as appropriate.

In one implementation, after converting the first letter of each word in the source file into lower case, the signature string for the source file may be generated as a concatenation of all of the letters in the source files. Operation 730 may then include comparing the signature of the source file to the signatures of the pre-filtered set of text patterns. For example, in one implementation, comparing the signature of the source file to the signatures of the text patterns may include determining whether one or more of the text pattern signatures are sub-strings of the source file signature. Thus, any signature matches may mark possible text patterns to be searched in one or more subsequent passes, whereas any signature mismatches may indicate that the text pattern is not contained within the source file, such that the mismatching text patterns may be discarded from further analysis in the subsequent passes.

In one implementation, the subsequent passes may include at least a parallel pattern matching process, which may be performed in an operation 740. In particular, the parallel pattern matching process may include determining whether the text patterns with signatures that match the source file signature are actual matches or false positives (i.e., text pattern signatures are sub-strings of the full pattern text, and therefore matching signatures may be false positives if the source file does not contain the entire text of the pattern). Furthermore, it will be apparent that performing a search on the full text of each text pattern may be very slow, particularly when dealing with a very large number of applicable text patterns and/or potentially overlapping matches. As such, the parallel pattern matching operation 740 may use a multi-pattern search algorithm based on spam-filter technology. For example, in one implementation, the multi-pattern search algorithm may implement the Wu-Manber search algorithm described in "A Fast Algorithm for Multi-Pattern Searching," Technical Report TR-94-17, Department of Computer Science, University of Arizona, by Sun Wu and Udi Manber (May 1993), the contents of which are hereby incorporated by reference in their entirety. In particular, the multi-pattern search algorithm may be based on the Perl module Search: WuManber, which implements the Wu-Manber search algorithm, as illustrated by the following exemplary Perl source code:

```
use Search::WuManber qw(init first next all);
my $search = init([qw(tribute reserved serve distribute)]);
my @matches = all($search, lc "All rights reserved. Distribute freely.");
my $match = first($search, lc "All rights reserved. Distribute freely.");
$match = next($search);
```

Thus, in one implementation, parallel pattern matching operation 740 may include preparing one or more search strings for parallel lookup (e.g., the search strings to be looked up in parallel may correspond to the full text of each text pattern with a matching signature). In particular, to prepare the search strings for parallel lookup, the search strings may be passed to an initialization function that returns an opaque reference to an internal data object. In one implementation, the internal data object may include a reference to the text to be searched (e.g., the source file under review), as well as the search strings to be matched against the text to be searched (e.g., keywords, text patterns, or any other string that has described herein as being searched or otherwise matched). For example, in addition to being suitable for parallel searching of text patterns against the source file, the multi-pattern search algorithm may be used to search keywords against text patterns as described in greater detail above, or to perform other searching operations described herein, as will be apparent. Furthermore, the algorithm may be implemented with a minimum block size of three, although it will be appreciated that the search algorithm may operate more efficiently with larger search strings (i.e., search strings that only include a few characters may yield an excessive number of false positives, thereby reducing the efficiency of the search algorithm).

Referring specifically to FIG. 7 and using the multi-pattern search algorithm to search a source file under review for matching text patterns, the parallel pattern matching operation 740 may further include iterating over each text position in the source file where at least one search string matches the source file text. Each of the matches may be returned as a reference to an array that includes an element for a text offset (representing the text position of the match) and an element for a search string list index (representing the search strings that match at that text position). Furthermore, in one implementation, the multi-pattern search algorithm may be configured to return the array in a roughly sorted manner, wherein the text offsets may appear out of sequence if neighboring search string matches have differing lengths, or the multi-pattern search algorithm may alternatively be configured to return the array in a sorted manner. For example, referring to the exemplary source code provided above, the expression my @m=all($search, $text) may be equivalent to the following code block:

```
my @m = (first($search, $text));
while (defined(my $m = next($search)))
{
    push @m, $m;
}
@m = sort { $a -> [0] <=> $b -> [0] } @m;
```

Although the multi-pattern search algorithm has been described herein as being used to search for text patterns that match one or more keywords, it will be apparent that the multi-pattern search algorithm may be used in any suitable searching context. For example, in one implementation, the multi-pattern search algorithm may also be applied when searching for matching keywords, signatures, or other information.

As such, using the multi-pattern search algorithm described above or another suitable pattern matching technique, information identifying each text pattern that has been matched to the source file under review may be recorded, wherein the identifying information may be recorded for each text position where a matching text pattern was identified. For example, the recorded information may include, among other things, an offset providing a line number where the match begins, an index of the text patterns matched to the source file at the offset, and a number of lines in the source file text that each matching text pattern covers. Furthermore, in one implementation, the matching text patterns may be sorted according to the number of lines covered in the source file in order to sort out overlapping matches that may otherwise provide inaccurate compliance or consistency results.

In one implementation, after the source file has been searched to identify matching text patterns, a determination may be made in an operation 750 as to whether at least one text pattern covers all of the keywords identified in the source file. If one or more keywords are not covered after searching all text patterns in the local set, one or more of the foregoing operations may be repeated using the global set of text patterns. If operation 750 determines that one or more keywords still remain uncovered after searching the global set of text patterns, a manual review editor may be initiated in an operation 760. For example, the manual review editor may provide an interactive interface that presents an excerpt of the source file that includes context surrounding the unmatched keywords. A compliance officer or other authorized reviewer may then be required to define a new text pattern to cover the unmatched keyword.

For example, in one implementation, operation 760 may include the compliance officer or other authorized reviewer shortening the excerpted text into a relevant phrase to create the new text pattern. The compliance officer or other authorized reviewer may then assign an identifier to the new text pattern, wherein the identifier may be associated with an existing license, cryptographic algorithm, or another suitable entry. In one implementation, a list of known licenses, cryptographic algorithm, or other entries may be generated and presented to the compliance officer or other authorized reviewer to suggest a relevant identifier. Alternatively, if the new text pattern refers to a license or other information that is not already known within the software due diligence system, the identifier for the new text pattern may be associated with a new license, cryptographic algorithm, or other language relevant to due diligence review.

Thus, once the compliance officer or other authorized reviewer has prepared a new text pattern for the unmatched keyword, the database of text patterns may be updated in an operation 770 to make the new text pattern available for subsequent due diligence reviews. As described above, for example, existing license entries or other entries in the database may be updated if associated with the new text pattern. Alternatively, when the new text pattern is not associated with an existing entry in the database, the new text pattern may be associated with a license identifier. For example, if the new text pattern for the unmatched keyword is not associated with a license or other language relevant to due diligence review, but the text pattern is likely to appear in additional packages or source files, operation 770 may include assigning an identifier of zero to the text pattern (i.e., not a license pattern). In another example, if the new text pattern is unlikely to appear in additional packages or source files, operation 770 may flag the text pattern as "local" and associate the text pattern with the package identifier of the current software under review. It will be apparent, however, that other alternatives or techniques may be used to determine the manner for assigning identifiers (e.g., identifiers may be assigned based on one or more policies, such as discarding certain patterns that are extremely unlikely to avoid an excessive number of patterns and to instead rely on MD5 checksums to handle particular unmatched keywords in subsequent runs).

Subsequently, after all of the keywords identified in the source have been covered by at least one text pattern, a report may be generated for the source file in an operation 780. For example, as has been described in greater detail above, the report may identify a risk level, distribution status, and/or matching licenses, among other things, thereby providing various types of information that can be used to ensure compatibility and compliance for software subject to due diligence review.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, and other things, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic has been described in connection with an aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, and the scope of the invention determined solely by the appended claims.

What is claimed is:

1. A method for providing due diligence of software using a license description syntax, wherein the license description syntax includes a plurality of attributes for describing software licenses, the method comprising:
   creating a license database that includes a plurality of entries, wherein each of the plurality of entries in the license database uniquely describes permissions and obligations associated with one version of an authoritative text for a respective software license;
   associating each of the plurality of entries in the license database with one or more of the plurality of attributes of the license description syntax, wherein the one or more attributes associated with at least one of the plurality of entries is arranged to uniquely describe said permissions and obligations of said version of authoritative text;
   combining the one or more of the plurality of entries by Boolean operators to form a complex entry for describing an applicable software license, wherein the complex entry comprises the one or more attributes of one or more of the plurality of entries and the relationships among the entries indicated b the Boolean operators;
   analyzing the software under due diligence to identify one or more software licenses as being applicable to said software, said analyzing comprising comparing a fingerprint of the software under due diligence with other fingerprints of other known software having known applicable software licenses to determine a match between the software under due diligence and the other known software; and
   identifying, upon determining a match, one or more entries in said license database that describe said known applicable software licenses.

2. The method of claim 1, wherein the plurality of attributes of the license description syntax include a full name attribute for providing a descriptive and distinct name for a software license, wherein the full name attribute can optionally further provide at least one of a version number or a timestamp for the software license.

3. The method of claim 1, wherein the plurality of attributes of the license description syntax include a short name attribute for providing a truncated representation of a full name for a software license, wherein the short name attribute for the software license includes a name element that begins with an upper case letter.

4. The method of claim 3, wherein the short name attribute for the software license further includes a version identifier that represents a version number associated with the software license.

5. The method of claim 1, wherein the plurality of attributes includes one or more descriptive identifiers for describing properties of the applicable software license.

6. The method of claim 5, wherein the properties described by the one or more descriptive identifiers include the applicable software license being one or more of a standalone clause or an aggregation of a plurality of software licenses.

7. The method of claim 1, wherein the complex license operators include a choice license operator for requiring a user to choose license clauses associated with one or more of a plurality of the entries in the license database, and wherein the complex license operators further include a mixed license operator for requiring a user to concurrently comply with different license clauses associated with a plurality of the entries in the license database.

8. The method of claim 7, wherein the mixed license operator can be used to add one or more of clauses to a software license or licenses to a software license class.

9. The method of claim 7, wherein the complex license operators further include one or more aggregation class operators for defining precedence among the choice license operator and the mixed license operator.

10. The method of claim 1, wherein the complex license operators include an exclusion operator for removing information associated with one of the entries in the license database, wherein the exclusion operator can be used to remove one or more of clauses from a software license or licenses from a software license class.

11. The method of claim 1, wherein the complex license operators include a modification operator for modifying information associated with one of the entries in the license database, wherein the modification operator can be used to modify a meaning of one or more clauses in a software license.

12. The method of claim 1, wherein the complex license operators include an equivalents operator for representing alternative expressions for an entry in the license database, wherein the alternative expressions are defined in terms of other entries in the license database.

13. The method of claim 1, wherein the plurality of attributes of the license description syntax include a list of a plurality of Uniform Resource Locators (URLs) containing full text of a software license, the method further comprising:
    ranking the plurality of URLs according to a level of authority; and
    identifying a highest ranked URL as the authoritative text.

14. The method of claim 1, further comprising:
    determining that the authoritative text for at least one of the software licenses described in the license database has undergone substantial revision; and
    creating a new entry in the license database to uniquely describe the substantial revision of the authoritative text for the at least one software license.

15. A system for due diligence of software using a license description syntax, wherein the license description syntax includes a plurality of attributes for describing software licenses, comprising:
    a license database configured to store a plurality of entries, wherein each of the plurality of entries in the license database uniquely describes permissions and obligations associated with one version of an authoritative text for a respective software license, and each of the plurality of the entries is associated with one or more of the plurality of attributes of the license description syntax, wherein the one or more attributes associated with at least one of the plurality of entries is arranged to uniquely describe said permissions and obligations of said version of authoritative text, and said one or more of the plurality of entries being combined by Boolean operators to form a complex entry that describes an applicable software license, the complex entry comprising the one or more attributes of one or more of the plurality of entries and the relationships among the entries indicated by the Boolean operators; and
    a software due diligence engine comprising a processor coupled to the license database, wherein the software due diligence engine is configured to:
    analyze the software under due diligence review to identify one or more licenses as being applicable to said software by comparing a fingerprint of the software under due diligence with other fingerprints of other known software having known applicable licenses to determine a match between the software under due diligence and the known software to identify an applicable license;
    identify, upon determining a match, one or more of the entries in the license database that respectively describe the known applicable licenses in said known applicable software, wherein the attributes associated with each of the identified entries respectively define permissions and obligations associated with the applicable licenses; and
    creating a compliance report for the software under due diligence review based on the permissions and obligations associated with the known applicable licenses.

16. The system of claim 15, further comprising a compiler coupled to the software due diligence system, wherein the compiler is configured to perform one or more operations using said complex operators on the attributes of the license description syntax associated with said identified applicable licenses to identify other entries describing software licenses with which the software must comply.

17. The system of claim 16, wherein the one or more operations performed by the compiler include evaluating one or more logical expressions to said determine the permissions and obligations associated with the applicable licenses.

18. The system of claim 17, wherein the one or more operations performed by the compiler include optimizing the logical expressions for at least one of size or readability.

19. The system of claim 16, wherein the one or more operations performed by the compiler include translating among two or more of the attributes of the license description syntax.

\* \* \* \* \*